US012755392B2

(12) United States Patent
Chaudhuri et al.

(10) Patent No.: US 12,755,392 B2
(45) Date of Patent: Oct. 6, 2026

(54) GENERATING SEGMENTATIONS AND TRACING ZONE BOUNDARIES OF RASTER IMAGES FOR DOWNSTREAM OPERATIONS

(71) Applicant: Adobe Inc., San Jose, CA (US)

(72) Inventors: Siddhartha Chaudhuri, New Haven, CT (US); Praveen Kumar Dhanuka, Howrah (IN); Nathan Carr, San Jose, CA (US); Kevin Wampler, Seattle, WA (US); Harish Kumar, Noida (IN)

(73) Assignee: Adobe Inc., San Jose, CA (US)

( * ) Notice: Subject to any disclaimer, the term of this patent is extended or adjusted under 35 U.S.C. 154(b) by 212 days.

(21) Appl. No.: 18/756,954

(22) Filed: Jun. 27, 2024

(65) Prior Publication Data

US 2026/0004431 A1 Jan. 1, 2026

(51) Int. Cl.
*G06T 7/13* (2017.01)
*G06T 7/90* (2017.01)

(52) U.S. Cl.
CPC .................. *G06T 7/13* (2017.01); *G06T 7/90* (2017.01); *G06T 2207/10024* (2013.01)

(58) Field of Classification Search
CPC ... G06T 7/13; G06T 7/90; G06T 2207/10024; G06T 7/149; G06T 7/12
See application file for complete search history.

(56) References Cited

U.S. PATENT DOCUMENTS 7,295,711 B1 * 11/2007 Ahuja .................. H04N 19/543 375/E7.076
10,685,488 B1 * 6/2020 Kumar .................. A61H 23/04
10,819,983 B1 * 10/2020 Wang ..................... G06V 20/40
2013/0129225 A1 * 5/2013 Poyil ......................... G06T 7/13 382/199
2017/0186174 A1 * 6/2017 George ..................... G06T 7/12
2019/0155973 A1 * 5/2019 Morczinek ............. G01C 11/04
2022/0086342 A1 * 3/2022 Hada ......................... G06T 1/60
2023/0082331 A1 * 3/2023 Banach ..................... G06T 7/11 382/104

(Continued)

OTHER PUBLICATIONS

Bernard A. Galler and Michael J. Fisher. "An Improved Equivalence Algorithm", Communications of the ACM, 7(5):301-303, May 1964.

(Continued)

*Primary Examiner* — Santiago Garcia
(74) *Attorney, Agent, or Firm* — Keller Preece PLLC

(57) ABSTRACT

Methods, systems, and non-transitory computer readable storage media are disclosed for generating segmentations of a raster image via a half-edge mesh structure with scanline operations. The disclosed system determines, during scan-line operations on a raster image, a plurality of sets of adjacent pixels having a common color value in the raster image. The disclosed system determines, during the scanline operations on the raster image, a plurality of half-edges at edges of pixels along a boundary of a set of adjacent pixels of the plurality of sets of adjacent pixels with next half-edge directions indicating directions of subsequent half-edges along the boundary of the set of adjacent pixels. The disclosed system generates one or more oriented polyline boundary loops representing the boundary of the set of adjacent pixels from the plurality of half-edges and the next half-edge directions of the set of adjacent pixels.

20 Claims, 13 Drawing Sheets

(56) References Cited

U.S. PATENT DOCUMENTS

| | | | | |
|---|---|---|---|---|
| 2023/0084189 A1* | 3/2023 | Banach | G06T 3/4084 | |
| | | | 382/173 | |
| 2024/0354963 A1* | 10/2024 | Yang | H04N 7/157 | |
| 2025/0301147 A1* | 9/2025 | Barker | H04N 19/137 | |
| 2026/0030905 A1* | 1/2026 | Yarom Zarfati | G06V 20/70 | |

OTHER PUBLICATIONS

D. E. Muller and F. P. Preparata. "Finding the Intersection of Two Convex Polyhedra", Theoretical Computer Science, 7(2):217-236, Mar. 1978.

J. Hoshen and R. Kopelman. "Percolation and cluster distribution. I. Cluster multiple labeling technique and critical concentration algorithm", Physical Review B, 14(8):3438-3445, Oct. 15, 1976.

Philip J. Schneider. "An Algorithm for Automatically Fitting Digitized Curves", In Andrew Glassner, editor, Graphics Gems, pp. 612-626. 1990.

S. Frijters, T. Krüger, and J. Harting. "Parallelised Hoshen-Kopelman algorithm for lattice-Boltzmann simulations", Computer Physics Communications, 189:92-98, 2015.

* cited by examiner

GENERATING SEGMENTATIONS AND TRACING ZONE BOUNDARIES OF RASTER IMAGES FOR DOWNSTREAM OPERATIONS

BACKGROUND

Many image editing tasks involve computer-assisted segmentation of raster images for additional downstream operations. For example, some segmentation tasks involve clustering of solid color regions of raster images for use in fitting splines to identified boundaries, vectorizing the raster images, object editing/replacement, answering queries for adjacencies between regions, or other geometry processing tasks. Accordingly, being able to accurately and efficiently segment the solid color regions in a raster image is an important task in such image editing operations. Due to the complexity of many raster images, conventional digital image systems that utilize naïve segmentation algorithms are often limited in both efficiency and flexibility.

SUMMARY

One or more embodiments provide benefits and/or solve one or more of the foregoing or other problems in the art with systems, methods, and non-transitory computer readable storage media for generating raster image segmentations via the use of a half-edge mesh structure with polyline boundary tracing. In particular, the disclosed systems determine zones including sets of adjacent pixels having common colors in a raster image during scanline operations on the raster image. Additionally, the disclosed systems generate half-edge mesh structures for the zones during the scanline operations by generating half-edges with next half-edge directions indicating directions of subsequent half-edges along boundaries of the zones. Furthermore, the disclosed systems utilize the half-edge mesh structures for the zones to generate oriented polyline boundary loops along the boundaries of the zones. In some embodiments, the disclosed systems also fit splines to the oriented polyline boundary loops. The disclosed systems thus provide accurate and efficient raster image segmentation during scanline processes with the flexibility to adapt the scanline processes to multithreading scenarios.

BRIEF DESCRIPTION OF THE DRAWINGS

Various embodiments will be described and explained with additional specificity and detail through the use of the accompanying drawings.

DETAILED DESCRIPTION

Figure 1:
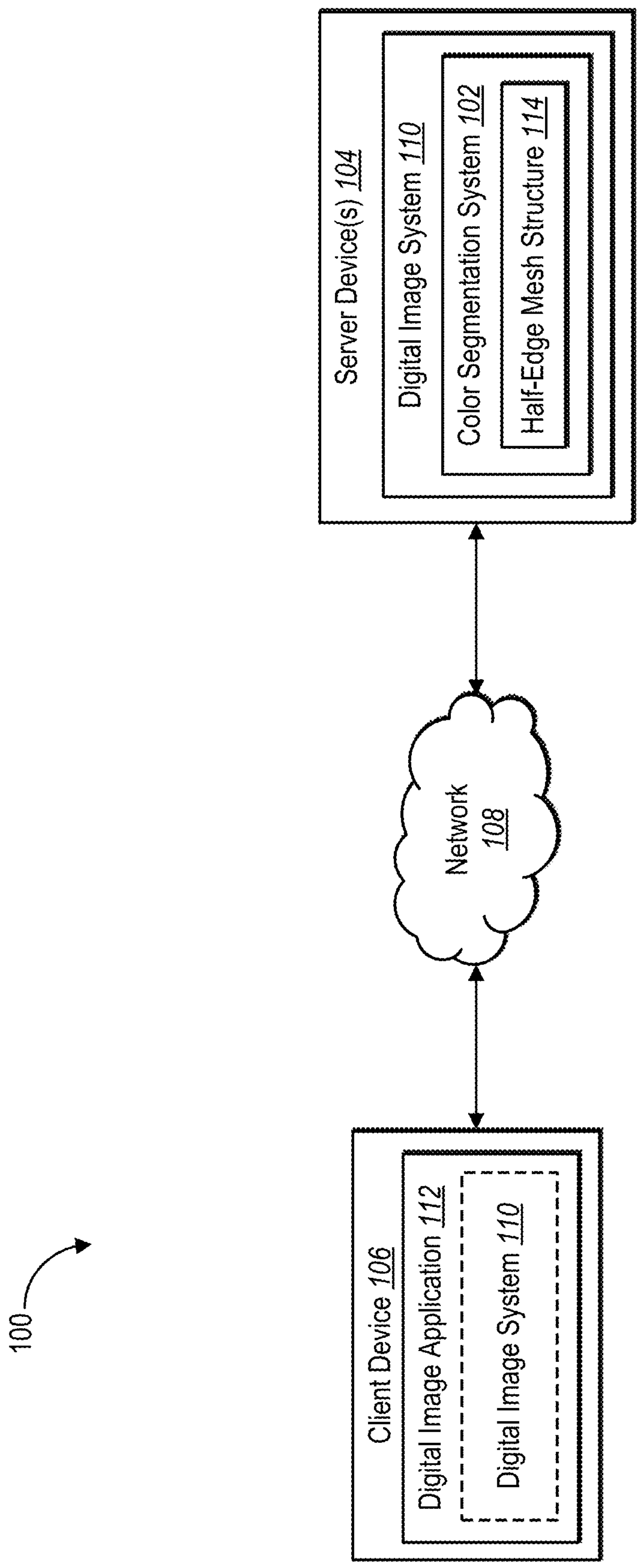
FIG. 1 illustrates an example system environment in which a color segmentation system operates in accordance with one or more implementations.

One or more embodiments of the present disclosure include a color segmentation system that generates segmentations of zones of a raster image with similar color values via half-edge mesh structures with scanline processing. In particular, in connection with performing scanline operations on pixels of a raster image, the color segmentation system determines zones of adjacent pixels having common color values. For each such zone during scanline operations, the color segmentation system generates half-edges along one or more boundaries of the zone with next half-edge direction information indicating directions of subsequent half-edges along the boundary(s). Additionally, the color segmentation system utilizes the half-edge information for a zone to generate one or more oriented polyline boundary loops along the one or more boundaries. In some embodiments, the color segmentation system utilizes the polyline boundary loops to generate segmentations for the raster image, such as by fitting splines to the polyline boundary loops.

As mentioned, in some embodiments, the color segmentation system determines zones and boundaries corresponding to the zones in a raster image. For example, the color segmentation system utilizes a union-find algorithm during scanline processing of the raster image to identify sets of adjacent pixels in the raster image that include common color values and store the zone information in union-find structures. Additionally, in connection with clustering pixels of the raster image into zones of similar color values (e.g., solid color zones), the color segmentation system also generates half-edges along boundaries of the zones during scanline processing. Specifically, the color segmentation system generates half-edge mesh structures that include half-edges indicating positions of half-edges along one or more boundaries of the zones. Furthermore, the color segmentation system stores next half-edge directions indicating directions from each half-edge to subsequent half-edges along the one or more boundaries according to the orientations of the half-edges.

In one or more embodiments, the color segmentation system utilizes the union-find structures and half-edge mesh structures to generate oriented polyline boundary loops along the boundaries of the zones. For example, the color segmentation system traces an oriented polyline boundary loop along a boundary of a solid color zone beginning at a seed half-edge and proceeding according to the half-edges and next half-edge directions stored for the solid color zone. In some embodiments, the color segmentation system also utilizes the oriented polyline boundary loops to generate splines fitted to the boundaries of the zones, such as for vectorizing the raster image or other downstream operations for the raster image. Additionally, the color segmentation system provides spline continuity and gap-free fitting according to various embodiments.

In some embodiments, the color segmentation system also adapts the segmentation process for multithreaded processors. In particular, the color segmentation system divides a raster image into blocks and performs scanline processing on the separate blocks to generate block-specific union-find structures and half-edge mesh structures. The color segmentation system updates the union-find structures and half-edge mesh structures from the separate blocks to merge the blocks utilizing scanline operations on the seams of the blocks to generate a merged segmentation of the raster image. Furthermore, in some embodiments, the color segmentation system parallelizes boundary tracing and spline fitting according to the specific zone boundaries in the separate blocks.

Conventional systems that provide raster image segmentation typically utilize inefficient methods of segmentation. Specifically, some conventional systems utilize naïve algorithms that utilize vector segmentations with fill operations (e.g., flood fill) to identify adjacent values in an image based on their similarity to an initial seed point. Although such conventional systems can provide segmentations on raster images, flood fill operations are computationally expensive, resulting in slow processing for complex raster images. Additionally, these conventional systems often utilize recursive operations that significantly increase the processing complexity and time.

Furthermore, many conventional systems lack flexibility by limiting the operations involved in raster segmentation to specific types of processing architectures or configurations. In particular, the conventional systems that utilize flood fill (or similar) vector segmentation operations are often limited to single thread processing. Thus, even in computing devices with multithreading capabilities, the conventional systems utilize segmentation processes that fail to use the multithreaded capabilities of the processors. Accordingly, because such operations are computationally expensive, the conventional systems utilize segmentation operations that result in unnecessarily slow processing.

The color segmentation system provides a number of advantages in computing systems that segment raster images. For example, the color segmentation system provides improved raster segmentation by generating an efficient data structure during scanline operations. In contrast to conventional systems that utilize naïve segmentation approaches such as flood fill operations, the color segmentation system performs raster segmentation much faster than the conventional systems. Additionally, as a result of performing the raster segmentation as part of scanline operations, the color segmentation system utilizes fewer computing resources than conventional systems that utilize the naïve approaches. Furthermore, the color segmentation system also avoids a significant number of recursive operations by performing the rasterization during scanline operations.

In addition to improving the efficiency, the color segmentation system also provides improved use of different processing architectures. Specifically, the color segmentation system improves flexibility of computing systems that implement raster image segmentation by providing multithreading with the scanline operations and half-edge mesh structures. In contrast to conventional systems that utilize single thread operations—and therefore underutilize multithread processor capabilities—the color segmentation system utilizes multithreaded scanline operations to segment raster images. For example, the color segmentation system divides a raster image into a plurality of blocks for separate processing by different threads of a multithreaded processor via the generation of half-edge mesh structures for each separate block. Additionally, the color segmentation system parallelizes polyline boundary tracing utilizing the half-edge mesh structures to allow computing systems with multithreaded processors to more quickly segment raster images.

The color segmentation system also provides improved handling of edge cases with thin structures of pixels. In particular, the color segmentation system provides consistent handling of different configurations of pixels sharing common color values with diagonally connected pixels. In contrast to conventional systems that often fail to correctly recognize when diagonally connected pixels are part of the same segment, the color segmentation system merges certain configurations of thinly connected structures for more accurate segmentation of raster images with fine details. Additionally, the color segmentation system provides improved flexibility via user interface tools for selectively suppressing diagonal merges.

Turning now to the figures, FIG. 1 includes an embodiment of a system environment 100 in which a color segmentation system 102 is implemented. In particular, the system environment 100 includes server device(s) 104 and a client device 106 in communication via a network 108. Moreover, as shown, the server device(s) 104 include a digital image system 110, which includes the color segmentation system 102. Furthermore, the client device 106 includes a digital image application 112, which optionally includes the digital image system 110 (and the color segmentation system 102).

As shown in FIG. 1, the client device 106 or the server device(s) 104 include or host the digital image system 110. The digital image system 110 includes, or is part of, one or more systems that implement digital image generation or editing operations. For example, the digital image system 110 provides tools for generating or editing digital images (e.g., raster images storing visual information as pixels). To illustrate, the digital image system 110 communicates with the client device 106 via the network 108 to provide the tools for display and interaction via the digital image application 112 at the client device 106. Additionally, in some embodiments, the digital image system 110 receives requests to access digital image data stored (e.g., at the server device(s) 104 or at another device such as a database) and/or requests to store digital image data. In some embodiments, the digital image system 110 receives interaction data for viewing or performing various image processing operations and provides the results of the interaction data (e.g., generated digital image data) for display via the digital image application 112 or to a third-party system.

According to one or more embodiments, the digital image system 110 utilizes the color segmentation system 102 to segment raster images. In particular, the color segmentation system 102 utilizes scanline operations (e.g., via a scanline renderer) to extract information about pixels in the raster images row-by-row. Furthermore, the color segmentation system 102 extracts half-edge information from the pixels during the scanline operations for storing in one or more data structures (e.g., a half-edge mesh structure 114). Accordingly, the color segmentation system 102 utilizes the half-edge mesh structure 114 to segment solid color regions/zones in a raster image for use in one or more downstream operations including, but not limited to, vectorizing the raster image, detecting specific content in the raster image, or other image editing tasks of the digital image system 110.

As illustrated in FIG. 1, the color segmentation system 102 is implemented on the client device 106 or on the server device(s) 104. In particular, in some implementations, the color segmentation system 102 on the server device(s) 104 supports the color segmentation system 102 on the client device 106. For instance, the server device(s) 104 generates or obtains the color segmentation system 102 for the client device 106 (e.g., as part of a software application or suite). The server device(s) 104 provides the color segmentation system 102 to the client device 106 for performing digital image editing processes at the client device 106. In other words, the client device 106 obtains (e.g., downloads) the color segmentation system 102 from the server device(s) 104. At this point, the client device 106 is able to utilize the color segmentation system 102 to edit digital images independently from the server device(s) 104.

In additional embodiments, although FIG. 1 illustrates the server device(s) 104 and the client device 106 communicating via the network 108, the various components of the system environment 100 communicate and/or interact via other methods (e.g., the server device(s) 104 and the client device 106 communicate directly). Furthermore, although FIG. 1 illustrates the color segmentation system 102 being implemented by a particular component and/or device within the system environment 100, the color segmentation system 102 is implemented, in whole or in part, by other computing devices and/or components in the system environment 100. For example, in some embodiments, the server device(s) 104 include or host the digital image system 110 and/or the color segmentation system 102.

To illustrate, the color segmentation system 102 includes a web hosting application that allows the client device 106 to interact with content and services hosted on the server device(s) 104 (e.g., in a software as a service implementation). To illustrate, in one or more implementations, the client device 106 accesses a web page supported by the server device(s) 104. The client device 106 provides input to the server device(s) 104 to view information for digital image segmentations and, in response, the color segmentation system 102 or the digital image system 110 on the server device(s) 104 performs operations to segment raster images. The server device(s) 104 provide the output or results of the operations to the client device 106.

In one or more embodiments, the server device(s) 104 include a variety of computing devices, including those described below with reference to FIG. 13. For example, the server device(s) 104 include one or more servers for storing and processing data associated with image editing processes. In some embodiments, the server device(s) 104 also include a plurality of computing devices in communication with each other, such as in a distributed storage environment. In some embodiments, the server device(s) 104 include a content server. The server device(s) 104 also optionally include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 13). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, generating, and editing digital images. In some embodiments, the client device 106 also performs functions for generating, capturing, or accessing data to provide to the digital image system 110 and the color segmentation system 102 in connection with editing digital images. For example, the client device 106 communicates with the server device(s) 104 via the network 108 to provide information (e.g., user interactions) associated with digital images. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 13.

Figure 2:
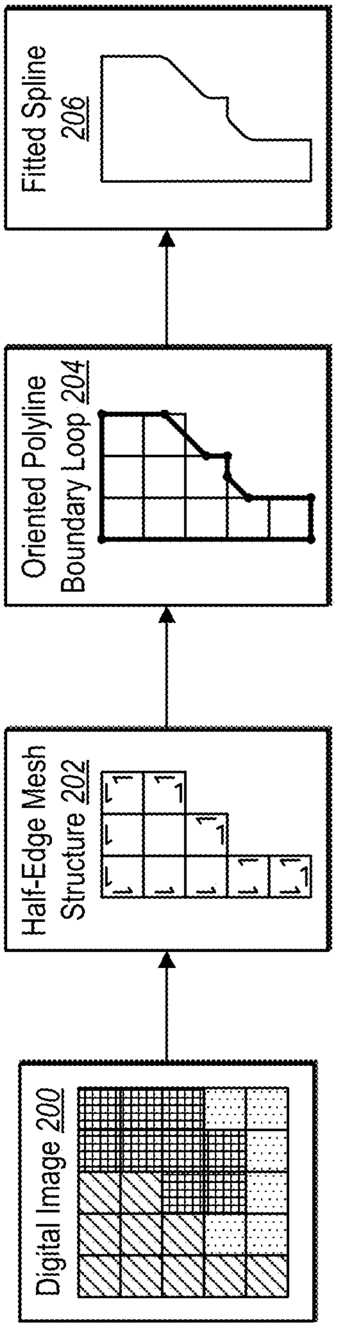
FIG. 2 illustrates a diagram of an overview of the color segmentation system fitting a spline to a polyline boundary of a solid color portion of a digital image in accordance with one or more implementations.

As mentioned, the color segmentation system 102 segments raster images during scanline operations via the use of half-edge mesh structures. FIG. 2 illustrates an overview diagram of the color segmentation system 102 determining half-edge information for zones including sets of adjacent pixels with common color values. Additionally, FIG. 2 illustrates utilizing the half-edge information to trace polyline boundaries along edges of the zones for fitting splines to the boundaries of the zones.

In one or more embodiments, as illustrated in FIG. 2, the color segmentation system 102 determines a digital image 200 to segment in connection with one or more image editing tasks. Specifically, the digital image 200 includes a raster image that stores visual information as a plurality of pixels with pixel values. For example, the digital image 200 includes a plurality of rows (and columns) of pixels according to a resolution of the digital image 200 to store color values in a specific color format (e.g., RGB or HSV).

Figure 3:
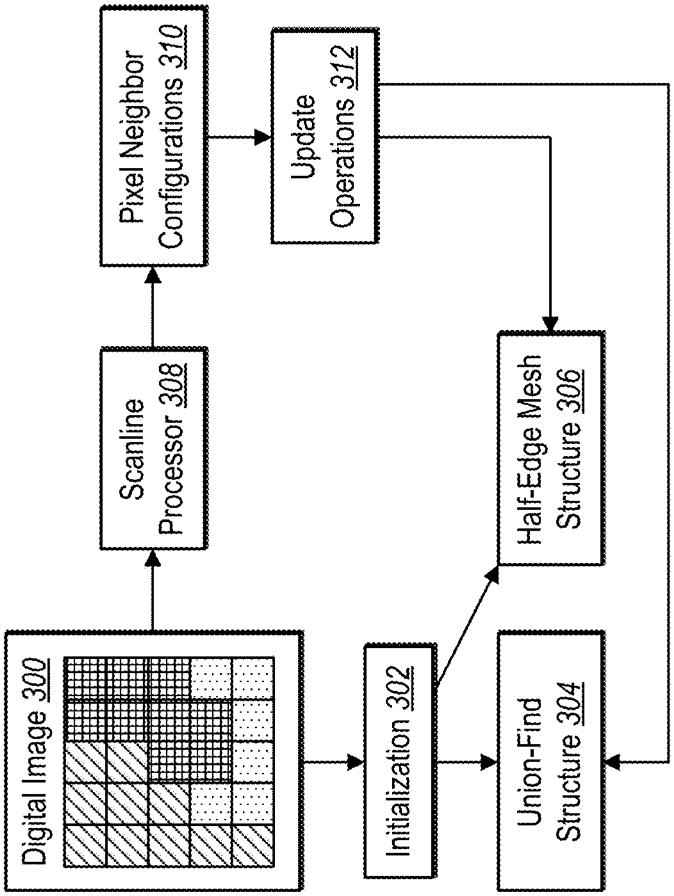
FIG. 3 illustrates a diagram of the color segmentation system generating and updating a solid color zone of adjacent pixels of a digital image utilizing half-edge information during scanline operations in accordance with one or more implementations.
Figure 4:
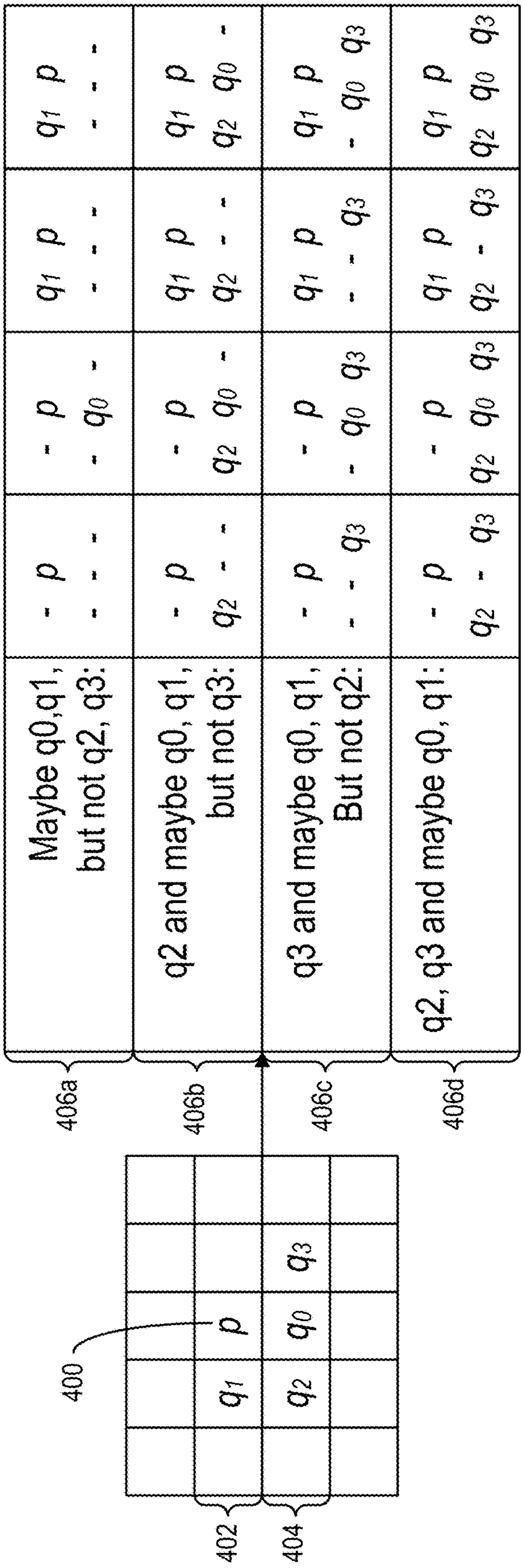
FIG. 4 illustrates a diagram of the color segmentation system determining configurations of pixels in a local neighborhood of a pixel during scanline operations in accordance with one or more implementations.

Additionally, in some embodiments, the color segmentation system 102 performs scanline operations on the digital image 200 to extract/determine information from the pixels in the digital image 200. Specifically, the color segmentation system 102 utilizes scanline rendering to analyze the pixels in the digital image 200 in a row-by-row process. To illustrate, the color segmentation system 102 performs the scanline operations in a bottom-up/left-to-right process (e.g., beginning with a bottom row of pixels of the digital image 200 and ending with a top row of pixels of the digital image 200). FIGS. 3-4 and the corresponding description provide additional detail related to determining zones of similar color values during scanline operations.

In connection with performing the scanline operations, assigns pixels of the digital image 200 to different zones based on color values of the pixels. For instance, the color segmentation system 102 assigns sets of adjacent pixels of the digital image 200 with common color values into distinct zones (e.g., via a union-find algorithm). More specifically, in one or more embodiments, a zone includes a set of pixels having the same or similar color values that are adjacent to each other (e.g., touching each other horizontally, vertically, or diagonally) within a local neighborhood of each pixel (e.g., four-connected neighborhoods or eight-connected neighborhoods) according to the scanline operations. In one or more embodiments, a common color value (e.g., the same or similar color value) indicates an equal color value or a color value within a threshold value. The color segmentation system 102 thus provides exact color matching for determining zones or color matching within a certain tolerance to allow for small variations of color values, such as due to compression loss in raster images.

Figure 5:
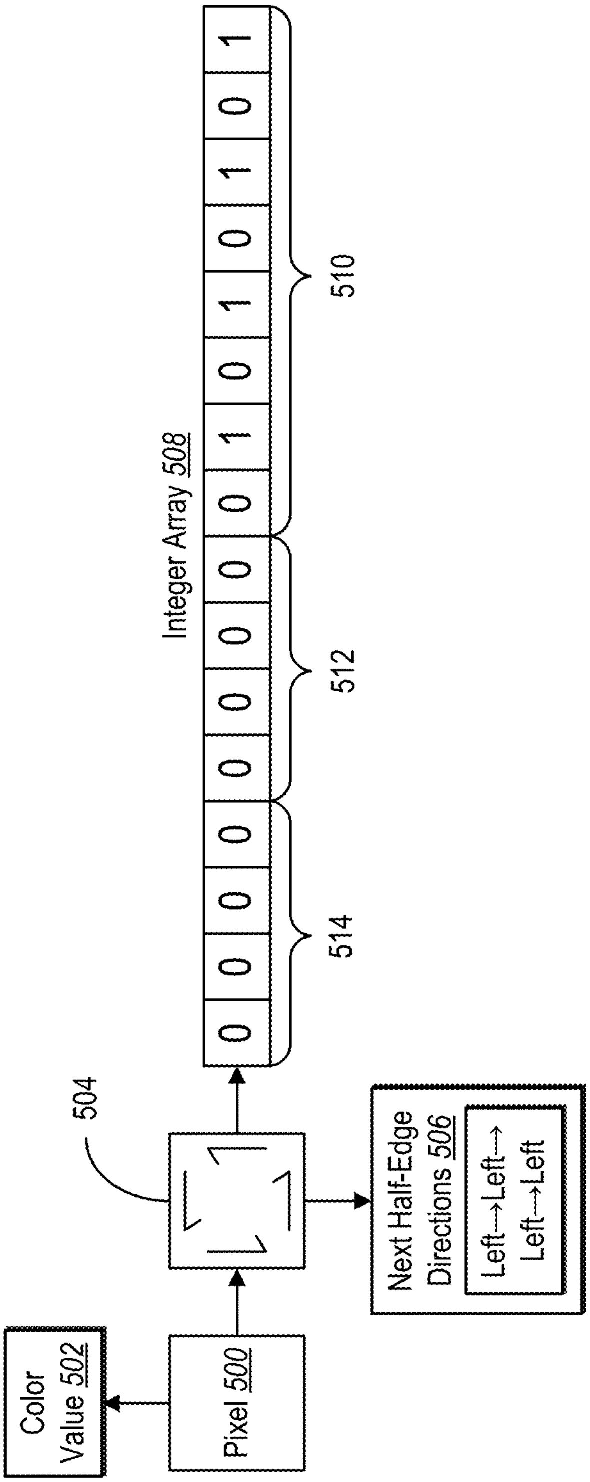
FIG. 5 illustrates a diagram of the color segmentation system generating color information and an integer array including half-edge information for a pixel of a raster image in accordance with one or more implementations.

Additionally, while traversing the rows of the digital image 200 during the scanline operations, the color segmentation system 102 generates a half-edge mesh structure 202 (or a plurality of half-edge mesh structures) including half-edge information for pixels of the digital image 200. In particular, the color segmentation system 102 generates half-edges along boundaries of the zones as the color segmentation system 102 processes the rows of pixels during scanline operations. Additionally, the color segmentation system 102 generates the half-edge mesh structure 202 to indicate next half-edge directions for subsequent half-edges along a boundary of a solid color zone. FIGS. 3 and 5 and the corresponding description provide additional detail related to the generation of half-edge mesh structures.

Figure 8:
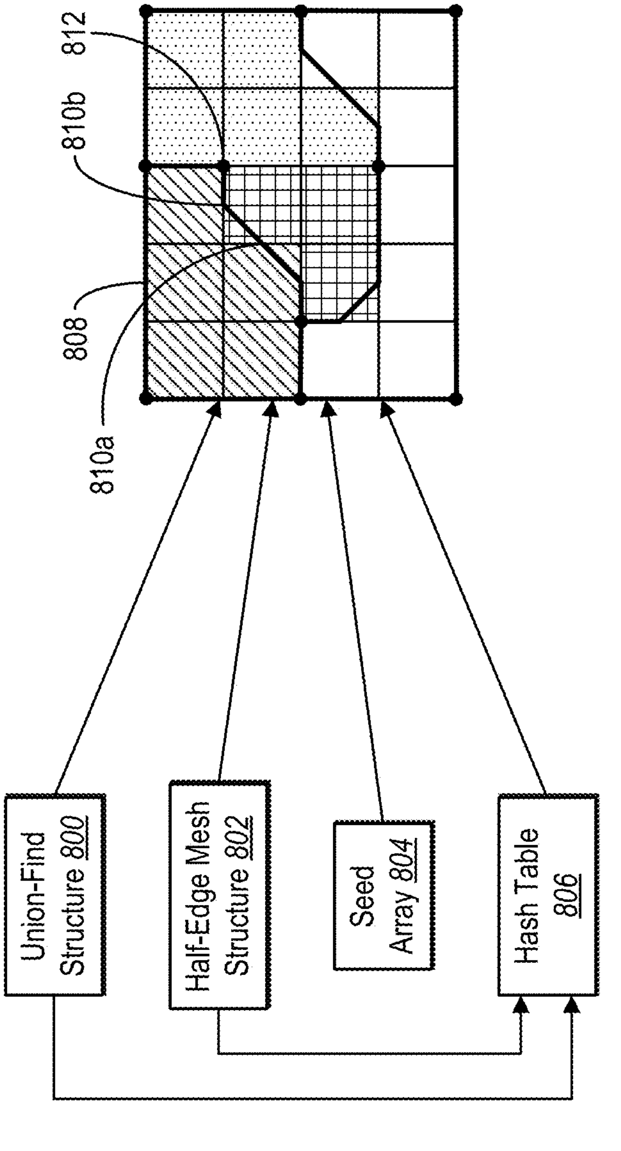
FIG. 8 illustrates a diagram of the color segmentation system generating oriented polyline boundary loops for solid color zones in a raster image in accordance with one or more implementations.

In one or more embodiments, the color segmentation system 102 utilizes the half-edge mesh structure 202 to generate an oriented polyline boundary loop 204 for a boundary of a solid color zone. Specifically, the color segmentation system 102 traces the oriented polyline boundary loop 204 along the boundary based on the half-edge information stored in the half-edge mesh structure 202. FIG. 8 and the corresponding description provide additional detail related to generating polyline boundaries for zones of a digital image.

Figure 9:
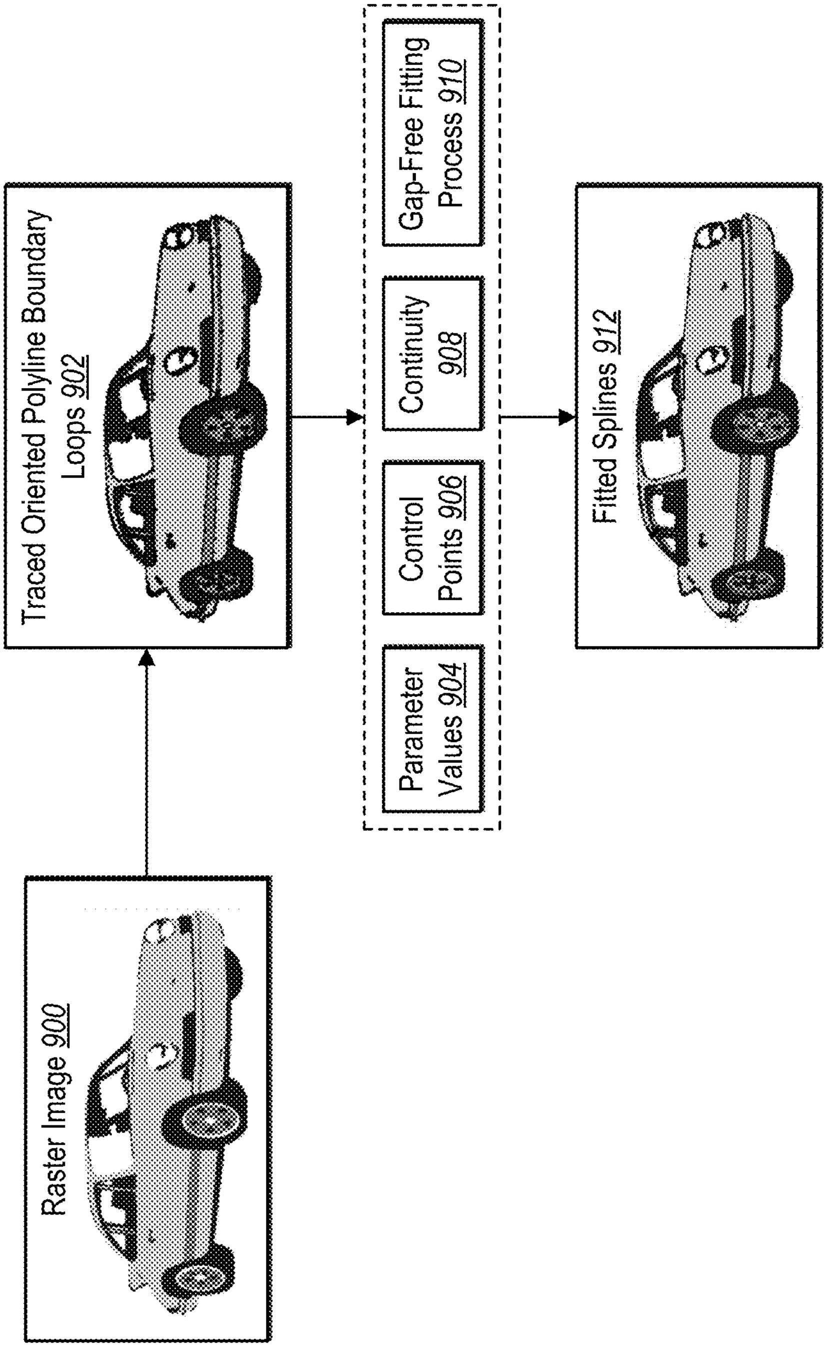
FIG. 9 illustrates a diagram of the color segmentation system fitting splines to boundaries of solid color zones in a raster image in accordance with one or more implementations.

As further illustrated in FIG. 2, in some embodiments, the color segmentation system 102 generates a fitted spline 206 to a boundary of a solid color zone. In particular, the color segmentation system 102 fits one or more splines to the oriented polyline boundary loop 204 to represent the boundary of the solid color zone with a spline (e.g., a Bezier curve, a B-spline, or other spline). To illustrate, the color segmentation system 102 generates the fitted spline 206 as part of one or more image editing operations, such as a vectorization operation for the digital image 200. FIG. 9 and the corresponding description provide additional detail related to fitting splines to boundaries of zones.

As mentioned, the color segmentation system 102 utilizes scanline operations to segment a raster image by grouping adjacent pixels into zones and generating half-edge information along boundaries of the zones. FIG. 3 illustrates an example process of the color segmentation system 102 generating a plurality of structures to represent the zones and half-edge information during scanline operations. For example, FIG. 3 illustrates that the color segmentation system 102 initializes and updates the structures during the scanline operations to generate half-edge information along boundaries of the zones in a single or limited scanline passes.

As illustrated in FIG. 3, the color segmentation system 102 determines a digital image 300 including a raster image of pixels. In one or more embodiments, the color segmentation system 102 also performs an initialization of a set of structures associated with determining zones of pixels with similar color values and tracing boundaries of the zones. In particular, as illustrated, the color segmentation system 102 initializes a union-find structure 306 and a half-edge mesh structure 308 that the color segmentation system 102 updates during processing of the pixels of the digital image 300.

In one or more embodiments, the union-find structure 306 includes data grouping similarly colored pixels into sets (e.g., zones). For example, the union-find structure 306 includes an index of pixels and their respective zones based on color values associated with the pixels (e.g., based on HSV or RGB values of the pixels). In some embodiments, initialization of the union-find structure 306 includes determining that each pixel of the digital image 300 is in a separate zone by itself (e.g., ∀p, id[p]==p). In one or more embodiments, the color segmentation system 102 generates the union-find structure 306 by utilizing a union-find algorithm as described by J. Hoshen and R. Kopelmen in "Percolation and cluster distribution. I. Cluster multiple labeling technique and critical concentration algorithm," in Physical Review B, 14: 3438-3445 (1976).

Furthermore, in one or more embodiments, the half-edge mesh structure 308 includes data tracking one or more closed, oriented polyline boundary loops of each solid color zone. For example, the half-edge mesh structure 308 includes data representing half-edges that flow or follow along edges between pixels according to boundaries of the zones. In some embodiments, the half-edge mesh structure 308 includes half-edges with orientations based on the type of boundary they represent. To illustrate, half-edges representing an outer boundary of a solid color zone are oriented in a counter-clockwise direction, while half-edges representing an inner boundary (e.g., for a hole) are oriented in a clockwise direction. In some embodiments, initialization of the half-edge mesh structure 308 includes determining that each pixel is enclosed in its own bounding loop of four half-edges with all other flags zeroed in an integer array for the pixel (e.g., ∀p, H[p]=00000000010101012).

Additionally, FIG. 3 illustrates that the color segmentation system 102 utilizes a scanline processor 304 to perform scanline operations on the digital image 300. For example, the color segmentation system 102 utilizes scanline operations on a row-by-row basis of the pixels in the digital image 300, such as from bottom-to-top by row and left-to-right by column within each row. In one or more embodiments, the scanline processor 302 includes a scanline renderer that performs the scanline operations in connection with rendering the digital image 300 on a display device.

In connection with processing the pixels during the scanline operations, the color segmentation system 102 determines pixel neighbor configurations 310 for the pixels. In particular, the color segmentation system 102 determines local neighborhoods of the pixels in the digital image 300. For instance, a local neighborhood of a pixel includes other pixels adjacent to the pixel that have been processed utilizing the scanline processor 302. In some embodiments, a local neighborhood of a pixel includes eight-connected pixels (e.g., horizontally, vertically, and diagonally adjacent pixels). In other embodiments, a local neighborhood of a pixel includes four-connected pixels (e.g., horizontally and vertically adjacent pixels). FIG. 4 and the corresponding description provides additional detail related to determining the pixel neighbor configurations 310.

In addition to determining the adjacent pixels in the local neighborhood of a pixel, the color segmentation system 102 performs update operations 312 to the initialized structures. Specifically, the color segmentation system 102 updates the union-find structure 306 based on the pixel neighbor configurations 310 by merging adjacent pixels with a common color value into a single set of adjacent pixels. Thus, the color segmentation system 102 performs the update operations 312 to modify the union-find structure 306 by merging the pixels of the digital image 300 into zones based on their adjacency and their color values.

Furthermore, in one or more embodiments, the color segmentation system 102 performs the update operations 312 to modify the half-edge mesh structure 308 to include half-edges only at the boundaries of the zones. For instance, the color segmentation system 102 modifies the integer arrays of pixels in a given zone based on the pixel neighbor configurations 310 and the half-edge information stored for the previously processed pixels in the current scanline and the previous scanline. To illustrate, the color segmentation system 102 removes one or more half-edges from one or more pixels and/or updates next half-edge directions for one or more half-edges along a boundary of a given zone as the scanline processor 302 processes each pixel of the digital image 300 according to the pixel neighbor configurations 310. In some embodiments, as described in more detail with respect to FIG. 5, the color segmentation system 102 also updates one or more additional flags for one or more pixels according to the information in the union-find structure 306 and/or the half-edge mesh structure 308.

As mentioned, FIG. 4 illustrates additional information associated with pixel neighbor configurations. Specifically, FIG. 4 illustrates possible pixel neighbor configurations for eight-connected pixels in relation to a current pixel during scanline operations. In one or more embodiments, the color segmentation system 102 analyzes the eight-connected pixels relative to a current pixel during scanline operations and updates the structures indicated above with respect to FIG. 3 based on the pixel neighbor configurations.

As illustrated in FIG. 4, for example, the color segmentation system 102 determines a local neighborhood of a current pixel 400 being processed. For example, the local neighborhood of the current pixel 400 includes adjacent pixels $q_i$ that were previously processed during scanline operations on a current scanline 402 and a previous scanline 404. In one or more embodiments, the color segmentation system 102 determines, at each pixel location $p^{ij}$ (in which i represents a row or scanline index and j represents a column)—or simply p, a strictly local neighborhood of four adjacent previously-visited pixels while maintaining pointers to the current scanline 402 and the previous scanline 404. Additionally, the local neighborhood includes neighbors $q_0$, $q_1$, $q_2$, $q_3$.

To illustrate, the local neighborhood of the current pixel 400 in an eight-connected scenario includes a previous pixel $q_1$ on the current scanline 402 that is horizontally adjacent to the current pixel 400. Furthermore, the local neighborhood of the current pixel 400 in the eight-connected scenario includes a vertically adjacent pixel $q_0$ below the current pixel 400 (in a bottom-to-top scanline operation) and diagonally adjacent pixels $q_2$, $q_3$ on the previous scanline 404. Although FIG. 4 illustrates a local neighborhood in an eight-connected scenario, a local neighborhood in a four-connected scenario includes only the previous pixel $q_1$ and the vertically adjacent pixel $q_0$.

In one or more embodiments, the color segmentation system 102 determines sixteen different possible combinations for the current pixel 400 and its neighboring pixels based on color values of the corresponding pixels. Specifically, the color segmentation system 102 determines a first group **406*a* of four possible configurations in which pixel $q_1$ and pixel $q_0$ may be in the same zone as pixel p, while the diagonally adjacent pixels $q_2$, $q_3$ are not in the same zone. Additionally, the color segmentation system 102 determines a second group 406*b* of four possible configurations in which pixel $q_2$ is in the same zone, pixels $q_0$, $q_1$ may be in the same zone as pixel p, and pixel $q_3$ is not in the same zone. The color segmentation system 102 determines a third group 406*c* of four possible configurations in which pixel $q_3$ is in the same zone, pixels $q_0$, $q_1$ may be in the same zone as pixel p, and pixel $q_2$ is not in the same zone. Furthermore, the color segmentation system 102 determines a fourth group 406*d*** of four possible configurations in which pixels $q_2$, $q_3$ may be in the same zone as pixel p, and pixels $q_0$, $q_1$ may be in the same zone.

Accordingly, utilizing the possible pixel neighbor configurations of FIG. 4, the color segmentation system 102 updates one or more union-find structures and one or more half-edge mesh structures for the digital image 300. For example, the color segmentation system 102 merges sets (zones) with similarly-colored neighbors (or same-colored neighbors) into a single set/zone. In some embodiments, because the color segmentation system 102 merges neighbors while processing previous neighbors, the neighbors are typically already in the same set, which avoids additional merge functions. Furthermore, the color segmentation system 102 merges the singleton set p into the set with the one or more previous neighbors.

In one or more embodiments, the color segmentation system 102 optimizes a union-find merge function in several steps. First, the color segmentation system 102 omits a function call to find the set representative of p given that p is a singleton. Additionally, the color segmentation system 102 makes p a child of the immediate parent of the matched neighbor $q_i$, unless the color segmentation system 102 is also tracking set sizes, in which case the color segmentation system 102 links p to the set representative (i.e., $q_i$'s earliest ancestor). In such embodiments, the color segmentation system 102 does not increase the tree depth, though such operations sometimes result in trees with more nodes at lower levels, though such levels are typically sparse compared to the total number of pixels. In some instances, the color segmentation system 102 also accelerates repeated queries by path compression.

In some embodiments, the color segmentation system 102 updates a half-edge mesh structure H corresponding to pixel p and its matching neighbors $q_i$. Specifically, the entries of H initially capture adjacent but disjoint zone boundaries. Once the color segmentation system 102 merges p into the set(s) of the neighbors, the color segmentation system 102 updates the boundary half-edges. For example, the color segmentation system 102 modifies the corresponding bits of the affected entries to either remove one or more half-edges or update the next half-edge directions of retained half-edges. As an example, the color segmentation system 102 half-edges of one or more pixels locally to remove one or more half-edges of two adjacent pixels in response to merging the two adjacent pixels into the same set without modifying half-edges of other pixels outside the local neighborhood.

In one or more embodiments, the color segmentation system 102 also updates one or more additional flags or attributes of the pixels indicated by the half-edge mesh structure. For example, as previously mentioned, the color segmentation system 102 generates an integer array including the half-edge information and additional information associated with the half-edge mesh structure and/or zones. FIG. 5 illustrates an example of the color segmentation system 102 generating an integer array including half-edge information and zone information for a pixel in connection with performing scanline operations on a digital image.

As illustrated in FIG. 5, the color segmentation system 102 identifies a pixel 500 being processed by a scanline processor. In connection with performing scanline operations, the color segmentation system 102 determines a color value 502 of the pixel 500, such as by obtaining a value stored for the pixel 500 in a particular color space (e.g., HSV or RGB). In some embodiments, the color segmentation system 102 utilizes the color value 502 to determine whether to merge the pixel 500 with one or more other zones corresponding to the local neighborhood of the pixel 500.

In one or more embodiments, the color segmentation system 102 also generates half-edges 504 along edges of the pixel 500. In particular, as mentioned, the color segmentation system 102 initially generates a singleton set including the pixel 500. Accordingly, the color segmentation system 102 generates one half-edge for each edge of the pixel 500, resulting in four half-edges along the boundary of the pixel 500. In one or more embodiments, a half-edge includes a directed vector for an edge of the pixel 500 in a single direction. For instance, an adjacent pixel sharing the edge with the pixel 500 has a half-edge in an opposite direction.

Furthermore, in one or more embodiments, the color segmentation system 102 also determines next half-edge directions 506 for the half-edges 504 of the set. For example, a next half-edge direction indicates a direction from one half-edge to another half-edge in a direction of the half-edge. To illustrate, if a half-edge along an edge of a pixel proceeds to the next half-edge without turning (e.g., both half-edges are along a single line in the same direction), the color segmentation system 102 generates a next half-edge direction indicating that the next half-edge is straight. Initially, because the pixel 500 is in a singleton set, the color segmentation system 102 generates next half-edge directions 506 to indicate all left turns from one edge of the pixel to another along the boundary of the pixel (i.e., left-left-left-left).

As illustrated in FIG. 5, the color segmentation system 102 generates an integer array 508 to indicate information about the pixel 500 in relation to a half-edge mesh structure. For example, the color segmentation system generates a 16-bit integer array including a first set of bits 510 indicating half-edges in the pixel 500, if existing, and next half-edge directions for any half-edges in the pixel 500. According to one or more examples, the first set of bits 510 includes bit pairs representing each edge of the pixel 500, including whether the edge has a half-edge, and if so, a next half-edge direction to a subsequent half-edge in the zone.

By representing such half-edge information utilizing pairs of bits, the bits store one of four possible values. To illustrate, a 0 value (e.g., 00) indicates that the edge of the pixel 500 is not part of a boundary of the zone. In some embodiments, a non-zero value indicates that the edge, as a half-edge directed counter-clockwise around the pixel 500, is part of the boundary of the zone, and the next half-edge is reached by moving left (e.g., 012), straight (e.g., 102), or right (e.g., 112) from the current edge. In one or more embodiments, the color segmentation system 102 assigns pairs of bits, starting from the lowest bits, to the bottom, right, top, and left edges of the pixel 500, respectively. In other embodiments, the color segmentation system 102 represents the edges using different bit values and/or utilizing different vector representations (e.g., 0, 1, 2, 3 . . . ).

In one or more embodiments, the color segmentation system 102 also stores one or more flags associated with the half-edge information. For example, as illustrated in FIG. 5, the color segmentation system 102 stores flags in a second set of bits 512 to indicate whether one or more edges are seed half-edges for a boundary of a zone. To illustrate, the color segmentation system 102 stores a separate value for each bit to indicate whether a corresponding half-edge is a seed half-edge (e.g., 0 for no, 1 for yes). According to one or more embodiments, a seed half-edge corresponds to a starting point (or a possible starting point) for tracing a boundary along half-edges of the boundary. Specifically, each boundary has at least one seed half-edge for use in beginning a trace along the boundary in connection with generating oriented polyline boundary loops in a subsequent pass.

According to one or more embodiments, the color segmentation system 102 determines whether the pixel 500 (i.e., p) potentially introduces one or more new boundary loops in a zone. In response to determining that the pixel 500 introduces a new boundary loop, the color segmentation system 102 records a representative horizontal half-edge for each such new boundary loop as a seed half-edge. For example, the color segmentation system 102 sets a seed bit for a half-edge at the bottom of the pixel 500 and the corresponding half-edge of the adjacent pixel (e.g., below the pixel 500) if the pixel 500 and the adjacent pixel have different color values, resulting in a bridge between the pixel 500 and the adjacent pixel that potentially introduces a new boundary loop in an unvisited region. In one or more embodiments, cases producing seed half-edges correspond to diagonal bridges (e.g., between p and $q_2/q_3$ as described previously), or p not matching any prior neighbors.

In addition to setting the appropriate bit seed for the corresponding edge of the pixel 500, the color segmentation system 102 also appends a reference to the seed half-edge including a pixel location, a half-edge identifier, and a pixel color to a seed array stored for the digital image. The color segmentation system 102 generates the seed array to include locations of all seed half-edges for the digital image to reduce additional operations when tracing boundary loops. For example, the seed array allows the color segmentation system 102 identify seed half-edges without needing to traverse the entire digital image looking for seed half-edges when tracing boundary loops. Furthermore, in some embodiments, the seed array has a size that is linear and not quadratic in relation to image dimensions for most cases.

In some embodiments, the color segmentation system 102 also determines a third set of bits 514 that store additional information about the pixel. For instance, one or more bits of the third set of bits 514 include information indicating whether the color value 502 of the pixel 500 is the same as the color value of the previous pixel in the same scanline. To illustrate, the color segmentation system 102 stores a bit value of 1 to indicate that the color value 502 of the pixel 500 matches the color value of the previous pixel. Additionally, in one or more embodiments, the color segmentation system 102 stores a bit indicating whether a predetermined corner (e.g., the bottom-left corner) of the pixel has a structure of a junction, which includes a point where three or more separate zones meet. More specifically, the color segmentation system 102 determines whether the predetermined point in the pixel 500 is a junction based on whether three or more zones with at least two separate color values (or in some cases three separate color values) meet at the junction.

Figure 6:
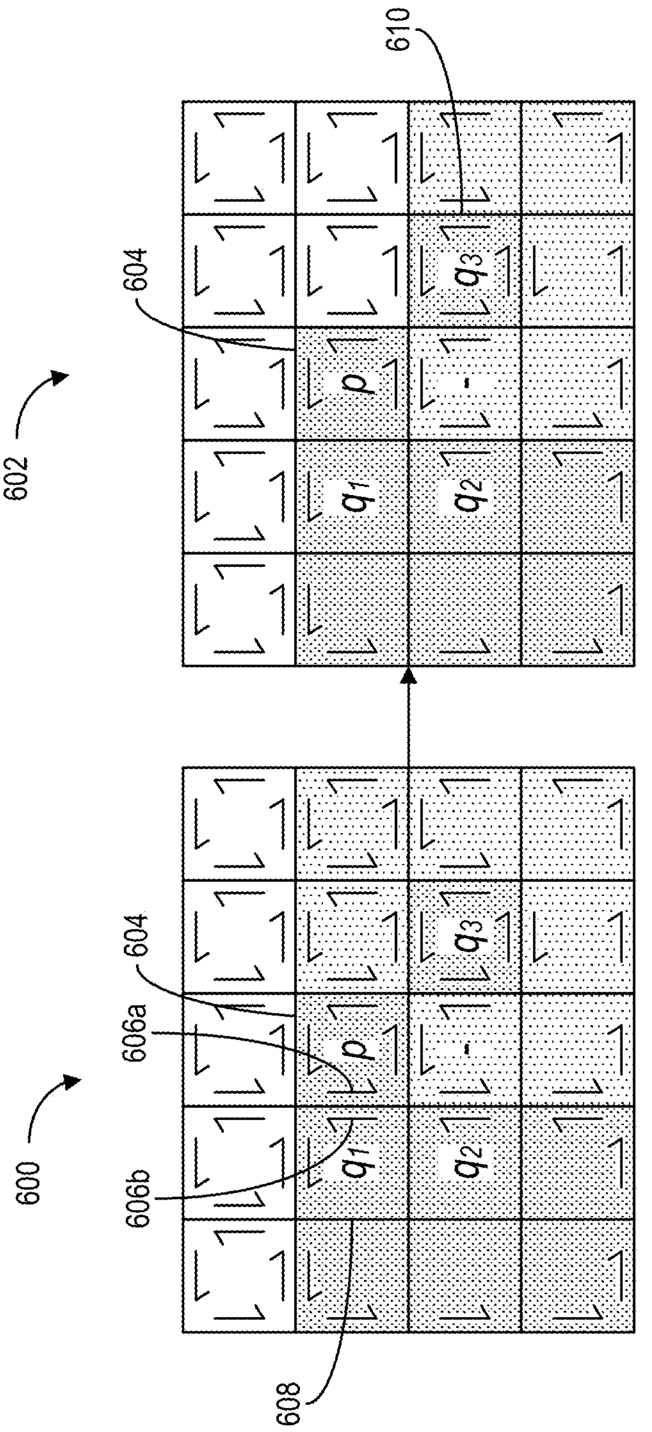
FIG. 6 illustrates a diagram of the color segmentation system merging two separate solid color zones and updating half-edge information for one or more pixels in accordance with one or more implementations.

In one or more embodiments, as mentioned, the color segmentation system 102 merges zones and updates half-edge information during scanline operations. FIG. 6 illustrates an example of the color segmentation system 102 merging zones of adjacent pixels having similar color values. Specifically, FIG. 6 illustrates that the color segmentation system 102 merges a pixel with adjacent pixels having the same or similar color in connection with performing scanline operations on a digital image.

As shown in FIG. 6, the color segmentation system 102 performs scanline operations to process pixels of a digital image row-by-row. Accordingly, FIG. 2 illustrates that the color segmentation system 102 determines an initial zone 600 prior to merging two or more sets of pixels and a merged zone 602 after merging zones. For instance, the color segmentation system 102 processes a first pixel 604 by initializing the first pixel 604 into a singleton set with a half-edge for each edge of the first pixel 604.

To illustrate, the color segmentation system 102 determines a half-edge 606*a* at an edge adjacent a second pixel 608. Given that the color segmentation system 102 previously processed the second pixel 608, the second pixel 608 also has a half-edge 606*b* at an edge adjacent the first pixel 604, regardless of the color values of the first pixel 604 and the second pixel 608. Furthermore, as illustrated, the half-edge 606*a* in the first pixel 604 has an opposite direction of the half-edge 606*b* of the second pixel 608.

In one or more embodiments, the color segmentation system 102 determines whether to merge the first pixel 604 with any of the other pixels in the local neighborhood. As illustrated in FIG. 6, the second pixel 608, which is horizontally adjacent to the first pixel 604 in the current scanline, and the two diagonally adjacent pixels have a common color value with the first pixel 604. Accordingly, the color segmentation system 102 determines to merge the sets including the first pixel 604 and the second pixel 608 (which is also in the same set as pixel $q_2$). The color segmentation system 102 also determines that the first pixel 604 possibly merges with the pixel $q_3$, depending on one or more other conditions (e.g., whether one or both the first pixel 604 or pixel $q_3$ belongs to a thin structure, as described in more detail below).

In connection with merging the first pixel 604 with the zone of the second pixel 608, the color segmentation system 102 updates a union-find structure indicating the specific zones of the pixels. Additionally, the color segmentation system 102 also updates a half-edge mesh structure including the edges by determining whether each half-edge in each pixel after merging belongs to the boundary of the current zone. For example, in response to merging the first pixel 604 and the second pixel 608, the color segmentation system 102 determines that the half-edge 606*a* and the half-edge 606*b* are no longer at the boundary. Accordingly, the color segmentation system 102 removes the half-edges from the half-edge mesh structure.

The color segmentation system 102 also updates the next half-edge directions affected by removing the half-edges to include the correct directions for the existing half-edges in the zone. For example, the next half-edge directions in the initial zone 600, beginning with the lower left horizontal half-edge in the zone, proceed as straight-left-straight-straight-left-straight-left-traight-straight-left. In connection with generating the merged zone 602, the color segmentation system 102 modifies the next half-edge directions to proceed as straight-left-straight-right-left-left-straight-straight-left-traight-straight-left.

Additionally, in one or more embodiments, the color segmentation system 102 determines that the merged zone 602 should also merge with the zone including a third pixel 610. In particular, in response to determining that the third pixel 610 has the same color value as the first pixel 604 and is in the local neighborhood of the first pixel 604, the color segmentation system 102 determines whether to merge the third pixel 610 into the zone with the first pixel 604 and the second pixel 608. For instance, the color segmentation system 102 determines whether to merge the third pixel 610 into the zone based on whether the third pixel 610 and the first pixel 604 belong to a thin structure, as described in more detail with respect to FIG. 7. In response to merging the third pixel 610 into the zone, the color segmentation system 102 further updates the union-find structure and the half-edge mesh structure accordingly.

In addition to modifying half-edges and/or next half-edge directions when merging zones, in some embodiments, the color segmentation system 102 also updates one or more other flags associated with one or more pixels. Specifically, in response to merging the first pixel 604 into the zone with the second pixel 608, the color segmentation system 102 updates a flag associated with the first pixel 604 indicating that the second pixel 608 has the same color as the first pixel 604. For instance, the color segmentation system 102 updates the corresponding bit of the integer array of the first pixel 604 to indicate that the previous pixel (i.e., the second pixel 608) has the same color value. In some instances, the color segmentation system 102 also updates a junction bit in the integer array of the first pixel 604 if the lower-left corner of the first pixel 604 is a junction (i.e., a 2×2 block including p, $q_0$, $q_1$, $q_2$ has at least three different zones). In one or more embodiments, the color segmentation system 102 also determines that points are junctions for image boundary points where two zones meet and image corners.

As mentioned above, in some embodiments, the color segmentation system 102 determines whether to merge two zones based on whether portions of the zones form a thin structure. In one or more embodiments, a thin structure includes certain cases in which two pixels of the same color are diagonally connected and the other two pixels in the same 2×2 block of pixels match in a different color (or have two different colors), thus resembling two intersecting single-pixel-wide diagonal lines. The color segmentation system 102 distinguishes between cases where two diagonally (and not otherwise) connected pixels belong to thin structures and do not belong to thin structures. Accordingly, in the latter case, the color segmentation system 102 suppresses a merge operation between two zones.

In one or more embodiments, the color segmentation system 102 determines whether pixels in a small region of a digital image belong to a thin structure by looking at similarly colored neighbor pixels (except the pixel that is a candidate for a merge operation). For example, the color segmentation system 102 determines whether the neighbors are separate from each other by intermediate non-matching pixels. In response to determining that the previous condition is true, the color segmentation system 102 determines that the pixels belong to a thin structure. In particular, the color segmentation system 102 determines three separate categories of configurations: 1) strictly thin, 2) thin but not strictly thin, and 3) not thin, corresponding to cases in which both, one, or none of the identified pixels are part of thin structures, respectively. Additionally, the color segmentation system 102 determines that the configuration is strictly thin if either pixel has no other similarly colored neighbor.

Figure 7:
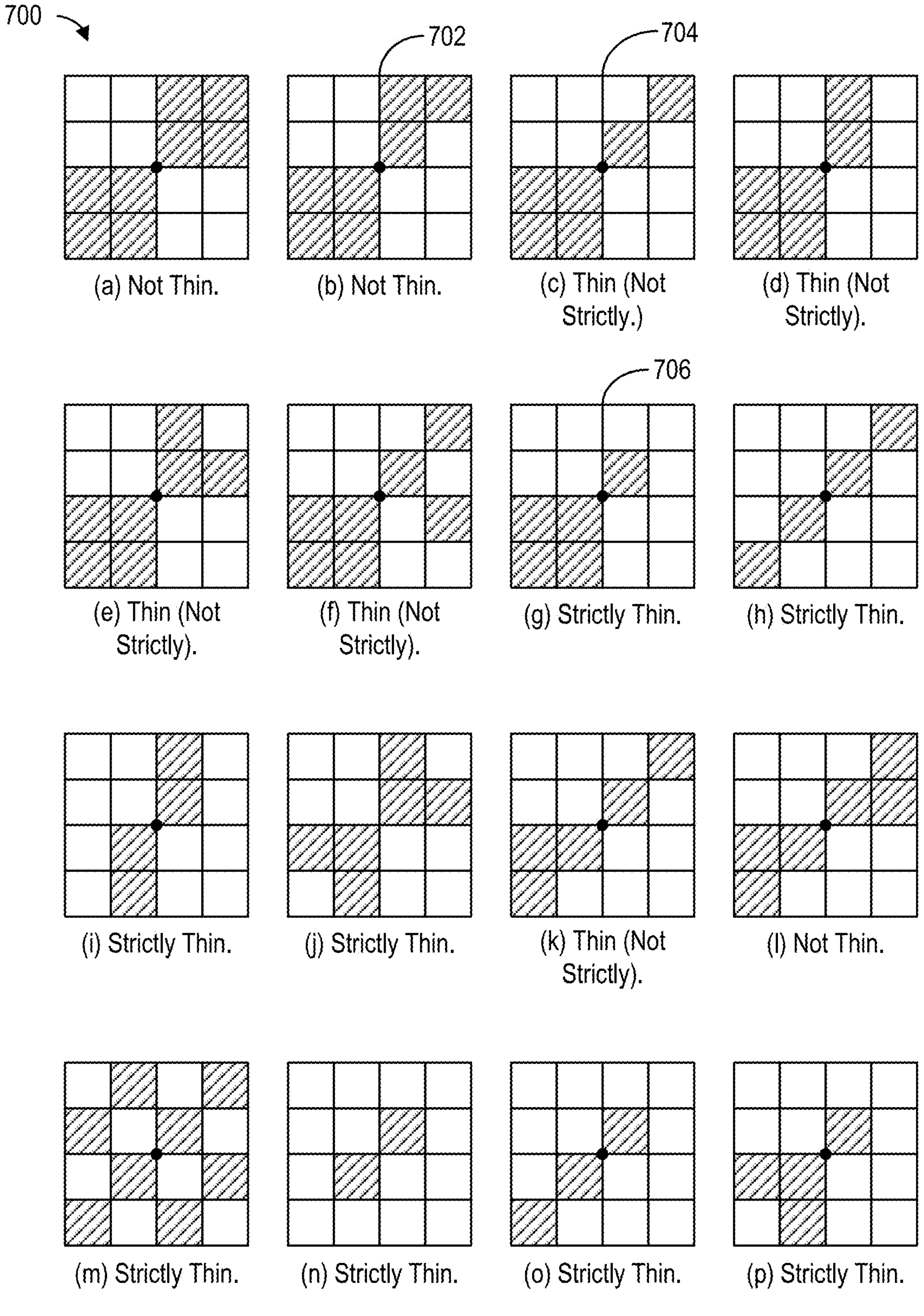
FIG. 7 illustrates a diagram of a plurality of configurations of diagonally adjacent solid color zones of pixels and categorizations of the configurations in accordance with one or more implementations.

FIG. 7 illustrates examples of different configurations 700 of pixels that result in categorizations indicated above. For example, the color segmentation system 102 determines that a first block of pixels 702 results in a not thin category. Additionally, the color segmentation system 102 determines that a second block of pixels 704 results in a thin but not strictly thin category. Furthermore, the color segmentation system 102 determines that a third block of pixels 706 results in a strictly thin category. Accordingly, as illustrated, the color segmentation system 102 determines categories for each pair of diagonally connected pixels with similar color values. As illustrated, in some embodiments, the color segmentation system 102 stores four scanlines in memory to determine whether pixels belong to a thin structure—the current scanline, the previous scanline, the one-before-previous scanline, and the next scanline.

Furthermore, the color segmentation system 102 determines whether to merge the pixels based on the category. For instance, the color segmentation system 102 merges pixels that fall under the strictly thin or thin but not strictly thin categories into a single zone while not merging pixels that fall under the not thin category. In additional embodiments, the color segmentation system 102 provides an option to suppress a merge operation for pixels that fall under both thin cases, the strictly thin case, or never. For example, the color segmentation system 102 provides an option to suppress merge operations for a case involving a single-pixel diagonal line across a solid background or for other, more complex cases.

In one or more embodiments, the color segmentation system 102 also generates a hash table T assigning consecutive indices to different zones (i.e., to the sets of the union-find structure U). Specifically, the color segmentation system 102 generates the hash table T in response to completing scanline operations for easier/faster querying of zones. For example, the color segmentation system 102 generates the hash table T by traversing over all zones. In some embodiments, the color segmentation system 102 traverses over the see half-edges in the seed array to determine the distinct zones instead of visiting each pixel in every zone given that each zone has at least one seed half-edge.

According to one or more embodiments, the color segmentation system 102 utilizes the hash table T to query a union-find structure U and identify zones of pixels. In one or more embodiments, U is a structure in which pixels are indexed sequentially as 0 . . . m×n and grouped into sets represented as trees in a forest. In one or more embodiments, U includes 1) an array id of m×n integers, one for each pixel, where id[p] represents the index of the parent of p (id[p]=p if singleton); and optionally 2) an array sz where sz[p] is the cardinality of the set containing p.

Additionally, in one or more embodiments, H includes an array of m×n 16-bit integers, one for each pixel. For example, bits 0-7 store boundary half-edge information and next half-edge direction information, as previously described. Bits 8-11 store seed bits indicating whether each half-edge is a seed half-edge. Bits 12-15 store flag bits with additional information about the pixel, including whether the previous pixel on the same scanline has the same color and whether the pixel includes a junction (e.g., at the bottom-left corner).

In one or more embodiments, the color segmentation system 102 looks up a zone containing p in U and maps that zone to a zone index using T. In other examples, the color segmentation system 102 utilizes a function that loops over pixels scanline-by-scanline, and for each pixel p, the color segmentation system 102 determines whether the flag bit of H[p] indicates that p has the same color as its predecessor on the scanline. If so, the color segmentation system 102 skips the U and T lookups and assigns p the same zone index as its predecessor, thereby reducing the lookup processing time associated with U and T.

In one or more embodiments, the color segmentation system 102 utilizes the previously described processes to determine maximal constant-color regions of the digital image to U and zone boundary loops corresponding to a chain of half-edges in H. Once the color segmentation system 102 has determined zones for pixels in a digital image and generated half-edges and corresponding half-edge information indicating boundaries of the zones, the color segmentation system 102 traces the boundaries of the zones. FIG. 8 illustrates an example of the color segmentation system 102 utilizing such information to generate oriented polyline boundary loops for the zones of a digital image.

In one or more embodiments, a polyline boundary loop includes a continuous line constructed from a list of points with straight-line segments connecting the points. Accordingly, the color segmentation system 102 generates one or more polyline boundary loops for one or more boundaries associated with each zone—e.g., an outer boundary and one or more inner boundaries (e.g., corresponding to one or more holes within the zone), if existing. Furthermore, an oriented polyline boundary loop has a directionality based on the underlying half-edges used to construct the oriented polyline boundary loop. The directionality of the oriented polyline boundary loop indicates whether the oriented polyline boundary loop corresponds to an outer boundary (e.g., counter-clockwise) or an inner boundary (clockwise).

In some embodiments, the color segmentation system 102 utilizes information from a union-find structure 800 and a half-edge mesh structure 802 corresponding to a digital image to generate oriented polyline boundary loops for zones of the digital image. Specifically, the color segmentation system 102 utilizes the union-find structure 800 to determine each zone (e.g., by querying the union-find structure 800 in conjunction with a hash table 806 as indicated above). In one or more embodiments, the color segmentation system 102 also leverages a seed array 804 to determine one or more zones of the digital image. In some embodiments, the color segmentation system 102 also utilizes the half-edge mesh structure 802 to determine the half-edges within a selected zone.

In addition to determining a zone via the union-find structure 800 and the half-edges of the zone via the half-edge mesh structure 802, the color segmentation system 102 accesses the seed array 804 to identify one or more seed half-edges corresponding to the zone. For example, the color segmentation system 102 determines whether a half-edge referenced by the seed array 804 has its seed bit set in its integer array, and if so, begins a new boundary loop starting with the selected half-edge. The color segmentation system 102 repeatedly executes a "next move" operation encoded by the corresponding bits of the integer array of each selected half-edge that indicate whether a half-edge exists and the corresponding next half-edge direction to trace the oriented polyline boundary loop. For example, FIG. 8 illustrates an oriented polyline boundary loop 808 traced for a particular zone.

Additionally, as the color segmentation system 102 visits each half-edge, the color segmentation system 102 unsets its seed bit indicating whether a half-edge is a seed half-edge (e.g., by setting the seed bit value to 0) to avoid tracing the same loop twice. In some embodiments, the color segmentation system 102 optionally looks up (e.g., in the union-find structure 800) the zone on the other side of a given half-edge and stores this information in a separate table B that associates each zone with its neighboring zones. Thus, the color segmentation system 102 repeatedly accesses new zones (e.g., via the hash table 806 and/or the seed array 804) and traces one or more oriented polyline boundary loops for each zone.

In one or more embodiments, the color segmentation system 102 avoids stair-stepping artifacts in the resulting oriented polyline boundary loops by using midpoints of the half-edges. For example, instead of generating segments of the oriented polyline boundary loops by connecting endpoints of the half-edges, the color segmentation system 102 generates segments by connecting midpoints of the half-edges to provide gap-free tracing at locations where two regions meet. As illustrated in FIG. 8, the color segmentation system 102 determines a first midpoint 810*a* of a first half-edge and a second midpoint 810*b* of a second half-edge that is subsequent to the first half-edge (e.g., according to the next half-edge directions). The color segmentation system 102 generates polyline vertices at the first midpoint 810*a* and the second midpoint 810*b* and generates a segment to connect the midpoints, resulting in a 45-degree line, thus reducing stair-stepping artifacts that would otherwise result from 90-degree angles by connecting the endpoints.

In some embodiments, the color segmentation system 102 determines junctions resulting from a plurality of different zones connecting at a single point. Specifically, a junction includes a point at which three or more zones meet. For example, as illustrated in FIG. 8, the color segmentation system 102 determines a junction 812 along the boundary of the zone at which the zone and two other zones meet. In response to detecting a junction corresponding to a half-edge (e.g., by accessing a junction bit in an integer array of the corresponding pixel), the color segmentation system 102 generates an additional polyline vertex at the endpoint of the half-edge and generates an additional segment from the second midpoint 810*b* to the junction 812. Similarly, the color segmentation system 102 generates a polyline segment from the junction 812 to a midpoint of the subsequent half-edge. Accordingly, the color segmentation system 102 allows stair-stepping at junctions to achieve gap-free tracing at the junctions.

In one or more embodiments, the color segmentation system 102 also optionally collapses consecutive collinear segments into single long segments. For example, in response to generating a number of successive horizontal segments (or vertical or diagonal segments) in a single direction, the color segmentation system 102 combines the successive segments into a single segment. To illustrate, the color segmentation system 102 removes one or more polyline vertices (e.g., corresponding to one or more midpoints of the respective half-edges) such that a single segment connects two polyline vertices at the ends of the successive segments. In one or more embodiments, the color segmentation system 102 combines segments only if the previous/current moves corresponding to next half-edge directions are straight/straight, left/right, or right/left.

In additional embodiments, the color segmentation system 102 generates polyline vertices at points other than the midpoints or endpoints of half-edges. For example, the color segmentation system 102 utilizes color analysis of pixels corresponding to half-edges (e.g., colors in adjacent regions) to determine whether to split at a midpoint or at another point along a half-edge based on colors in the adjacent regions (e.g., based on the closeness or difference of color values). To illustrate, in response to comparing color values in adjacent pixels separated by half-edges along region boundaries, the color segmentation system 102 determines that a point other than a midpoint of the half-edge produces accurate spline generation based on the similarity or difference of the color values. Furthermore, in some embodiments, the color segmentation system 102 utilizes a shape formed by successive half-edges in determining locations of points of the half-edges (e.g., whether midpoints, endpoints, or other points) that result in accurate spline generation.

In one or more embodiments, once the color segmentation system 102 has generated one or more polyline boundary loops for one or more zones of a digital image, the color segmentation system 102 fits one or more splines to each of the polyline boundary loops. FIG. 9 illustrates an example of the color segmentation system 102 fitting splines to oriented polyline boundary loops that were traced for zones of a raster image. Specifically, the color segmentation system 102 generates splines that fit to the boundaries of the zones while providing continuity and gap-free fitting.

As illustrated in FIG. 9, the color segmentation system 102 determines a raster image 900 including a plurality of pixels of various colors. As described above, the color segmentation system 102 utilizes a union-find algorithm with half-edge information to generate traced oriented polyline boundary loops 902 corresponding to the edges of the zones. Because the traced oriented polyline boundary loops 902 potentially include many different segments and vertices, the color segmentation system 102 fits splines to the traced oriented polyline boundary loops 902 to simplify the number of vertices and provide smooth curves at the boundaries of zones.

For example, in some embodiments given a closed polyline boundary loop, the color segmentation system 102 utilizes a recursive model to fit a single spline (e.g., a Bezier curve) starting at a first vertex in a sequence of k vertices and ending at a last vertex (which is the first vertex in a closed loop). For example, the color segmentation system 102 performs a series of operations including determining parameter values 904 at vertices for an arc-length along an oriented polyline boundary. Additionally, the color segmentation system 102 fixes the parameter values 904 and terminal control points and finds the positions of control points 906 in the middle of the spline to minimize the sum of squared distances to the polyline vertices (e.g., utilizing a linear least squares model). Furthermore, the color segmentation system 102 constructs the 2×2 pseudoinverse matrix incrementally as it traverses the polyline vertices. In some embodiments, the color segmentation system 102 stores a k×2 coefficient matrix for later determining the maximum error point.

In one or more embodiments, the color segmentation system 102 fixes the control points 906 in the spline and updates the parameter values 904. For instance, the color segmentation system 102 utilizes a root-finding algorithm to approximate the parameter values 904 in one or more steps. Furthermore, in some embodiments, the color segmentation system 102 iteratively repeats the above steps of finding the control points 906 and updating the parameter values 904 until meeting a specific fitting error (e.g., in view of a specified tolerance) at the polyline vertices. In additional embodiments, the color segmentation system 102 splits the oriented polyline boundary loop at a vertex with a maximum fitting error and recurses into two separate segments in response to determining that the fitting error cannot be met with the current segment. Additionally, in some embodiments, the color segmentation system 102 utilizes a stack to avoid recursive function calls and orders stack pushes to generate the control points 906 of the full spline in sequential order.

In at least some embodiments, the color segmentation system 102 avoids fitting splines where straight lines are more suitable. For example, the color segmentation system 102 attempts to fit a straight line to a polyline segment (e.g., using linear least squares). In response to determining that the straight line does not fit the polyline segment within the specified fitting error, the color segmentation system 102 performs the operations above to fit a spline to the polyline segment.

In one or more embodiments, the color segmentation system 102 also performs one or more operations to ensure continuity 908 of a fitted spline. For example, the color segmentation system 102 detects transitions between spline segments that should be smooth and locally refits the spline segments to have continuity 908 (e.g., G1 continuity) at the transition. Specifically, for a given spline segment, the color segmentation system 102 examines the left and right tangents at the initial and final control points of the spline segment to determine whether the tangents are within an angular threshold (e.g., nearly codirectional within a specified number of degrees). In response to the color segmentation system 102 determining that the tangents are within the angular threshold, the color segmentation system 102 considers the transition to be smooth, which involves four possible cases: 1) neither the initial or final transition is smooth, 2) only the initial transition is smooth, 3) only the final transition is smooth, and 4) both transitions are smooth. In one or more embodiments, the color segmentation system 102 determines that transitions involving straight line segments are not smooth.

According to some embodiments, for cases involving only the initial transition being smooth, the color segmentation system 102 estimates a smoothed initial tangent as the average of the left and right tangents and constrains the second control point to lie on a ray along this tangent. For the case involving only the final transition being smooth, the color segmentation system 102 similarly estimates a smooth final tangent and constrains the third control point accordingly. In one or more embodiments, the color segmentation system 102 determines a small quadratic program in 2 variables (for the fourth case involving both transitions being smooth) or 3 variables (for the second and third cases involving only the initial transition or only the final transition being smooth) solved with one (e.g., for the second and third cases) or two (e.g., for the fourth case) lower-bound constraints. Accordingly, the color segmentation system 102 determines smoothed control points that do not collapse into the initial/final points or lie along negative directions of the rays. In some embodiments, the color segmentation system 102 constructs the quadratic program matrices incrementally and solves the quadratic program by attempting an unconstrained solution (e.g., linear least squares) before attempting different combinations of fixed and free variables until obtaining primal and dual conditions that satisfy tolerances/thresholds. The resulting algorithm is non-iterative and amounts to four linear least square solves in the worst case scenario.

As illustrated in FIG. 9, in some embodiments, the color segmentation system 102 also performs a gap-free fitting process 910. Specifically, the color segmentation system 102 avoids gaps between boundaries of adjacent zones for each fitted spline based on previously fitted splines. For example, the color segmentation system 102 splits each zone boundary at junction points (e.g., as previously determined for the half-edges) and fits splines independently to each polyline segment between consecutive junctions. In one or more embodiments, because each incidence of three or more zones results in a junction, the color segmentation system 102 ensures that each spline segment has exactly two adjacent zones and is consistently distinguished (in opposite direction) along its boundary. In response to determining that a particular traced oriented polyline boundary loop has no junctions (e.g., one zone is contained in another), the color segmentation system 102 chooses the lexicographically bottom-left vertex as a starting and ending junction, which is consistent for the traced oriented polyline boundary loop and its oppositely oriented twin.

The color segmentation system 102 also references control point sequences of previously fitted splines in a hash table indexed by corresponding polyline segments. For example, the color segmentation system 102 generates a hash of a polyline segment by combining the hashes of its vertices. Additionally, in some embodiments given the assumption that every vertex coordinate is either an integer or a half-integer, the color segmentation system 102 multiplies the coordinates by two and hashes the resulting integers for stability.

When processing a new polyline segment, the color segmentation system 102 determines whether the polyline segment in the reversed direction already has a fitted spline. In response to determining that the opposite polyline segment does have a fitted spline, the color segmentation system 102 returns the same control points of the fitted spline in reverse order or reversed direction according to the direction of the polyline segment. Otherwise, the color segmentation system 102 performs the spline fitting operations above and adds the new data to the hash table. Accordingly, the color segmentation system 102 ensures that each polyline segment along a boundary that is common to two zones is consistently fitted, yielding gap-free fitted splines for most scenarios. FIG. 9 illustrates that the color segmentation system 102 generates fitted splines 912 along the boundaries of a plurality of zones for the raster image 900 with fewer control points than the traced oriented polyline boundary loops 902.

Figure 10:
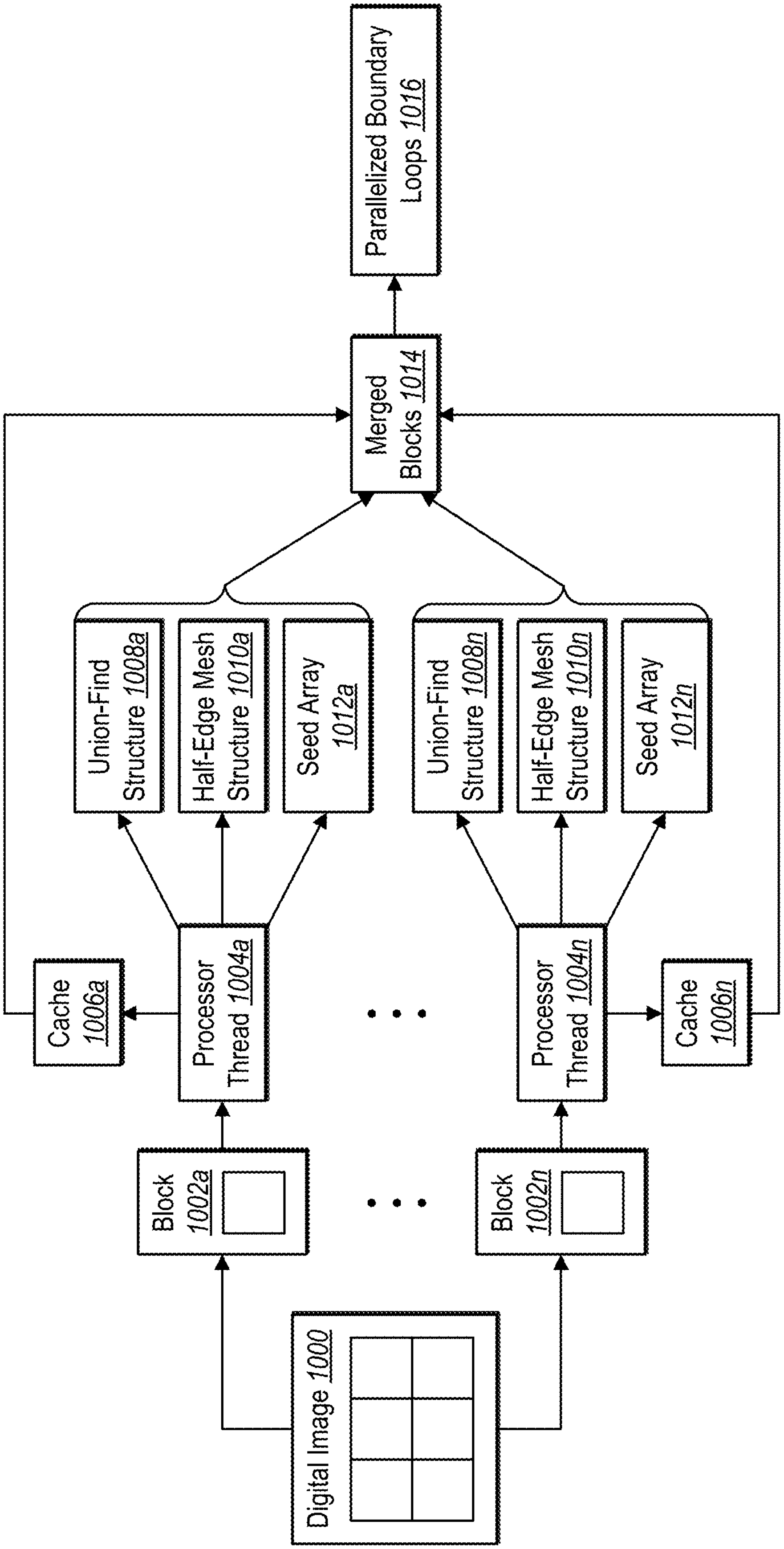
FIG. 10 illustrates a diagram of the color segmentation system tracing boundary loops for solid color zones in a raster image using multithreading processes in accordance with one or more implementations.

In one or more embodiments, as previously mentioned, the color segmentation system 102 also adapts the processes for tracing polyline boundary loops for zones of a raster image for multithreaded processors. FIG. 10 illustrates an example of a process for tracing polyline boundary loops for a digital image in a multithreaded processor. For example, FIG. 10 illustrates that the color segmentation system 102 divides the image into separate blocks and generates individual structures for the separate blocks.

As illustrated in FIG. 10, the color segmentation system 102 divides a digital image 1000 into a plurality of separate blocks (e.g., blocks 1002*a*-1002*n*), one for each separate processor thread of a multithreaded processor (e.g., processor threads 1004*a*-1004*n*). The color segmentation system 102 utilizes scanline operations to process the separate blocks (each including a number of pixel rows) via the different processor threads. Additionally, the color segmentation system 102 seals the seams at the edges of two separate blocks by merging similarly colored pixels in the scanlines on opposite sides of each seam.

In one or more embodiments, the color segmentation system 102 allows the processor threads 1004*a*-1004*n* to access the union-find structure U during initial per-block processing. Given that their associated blocks are disjoint, the color segmentation system 102 also accesses disjoint sets of union-find structures (e.g., union-find structures 1008*a*-1008*n*) such that there are no conflicts when accessing id and sz, as previously described. In one or more embodiments, the color segmentation system 102 creates an independent counter variable for each processor thread that is updated locally without synchronization and which is used to compute an overall set count across all processor threads. Furthermore, the color segmentation system 102 determines a half-edge mesh structure (e.g., half-edge mesh structures 1010*a*-1010*n*) for the half-edges within each corresponding block. In additional embodiments, the color segmentation system 102 replaces a global seed array of seed half-edges with per-thread arrays (e.g., see arrays 1012*a*-1012*n*) updated without synchronization. Subsequent global processing loops over all of the per-thread arrays to traverse the full set of seed half-edges.

Additionally, when sealing seams of blocks, the color segmentation system 102 assumes that both scanlines bordering a seam were already processed at the time of sealing. In one or more embodiments, the color segmentation system 102 utilizes an assumption that, for a current pixel p and previous pixel $q_0$ processed by a processor thread have already been merged into a single set if they have the same color value. The color segmentation system 102 utilizes explicit synchronization to parallelize the seam sealing operations and generate merged blocks 1014 by updating the half-edges and next half-edge directions of the corresponding pixels/zones in the merged blocks 1014.

In one or more embodiments, for tiled images divided into u×v tiles of $m_t$×$n_t$ pixels each, the color segmentation system 102 generates outer loops that step through tiles one-by-one and processes each as an independent image using the multithreading steps above. Additionally, the color segmentation system 102 also stores the pixels at the borders of the tile (e.g., two rows and two columns) in a cache (e.g., a single cache or a plurality of caches 1006*a*-1006*n* corresponding to the processor threads 1004*a*-1004*n*). In the first of two additional seam-sealing passes, the color segmentation system 102 merges the matching pixels across the horizontal seam between the last row of each tile and the first row of the above it (assuming bottom-to-top scanline operations) using the cache to access color values instead of accessing the color values from the digital image 1000. Once the column of tiles is ready, the color segmentation system 102 performs a second seam-sealing pass to merge pixels bridging the full vertical seam between adjacent columns of tiles. The color segmentation system 102 implements operations to merge matching pixels across two scanlines (horizontal or vertical), as described previously, as a single templated function modified by the template parameters for each pass.

Furthermore, in one or more embodiments, the color segmentation system 102 determines parallelized boundary loops 1016 via parallelized boundary tracing operations. For example, the color segmentation system 102 assigns each processor thread a block of zone indices. When looping over seed half-edges, the color segmentation system 102 looks up their corresponding zones and skips over half-edges of zones outside its block. The color segmentation system 102 thus utilizes a processor thread to trace a disjoint set of boundaries from other processor threads. In some embodiments, the color segmentation system 102 also parallelizes spline fitting operations accordingly.

Figure 11:
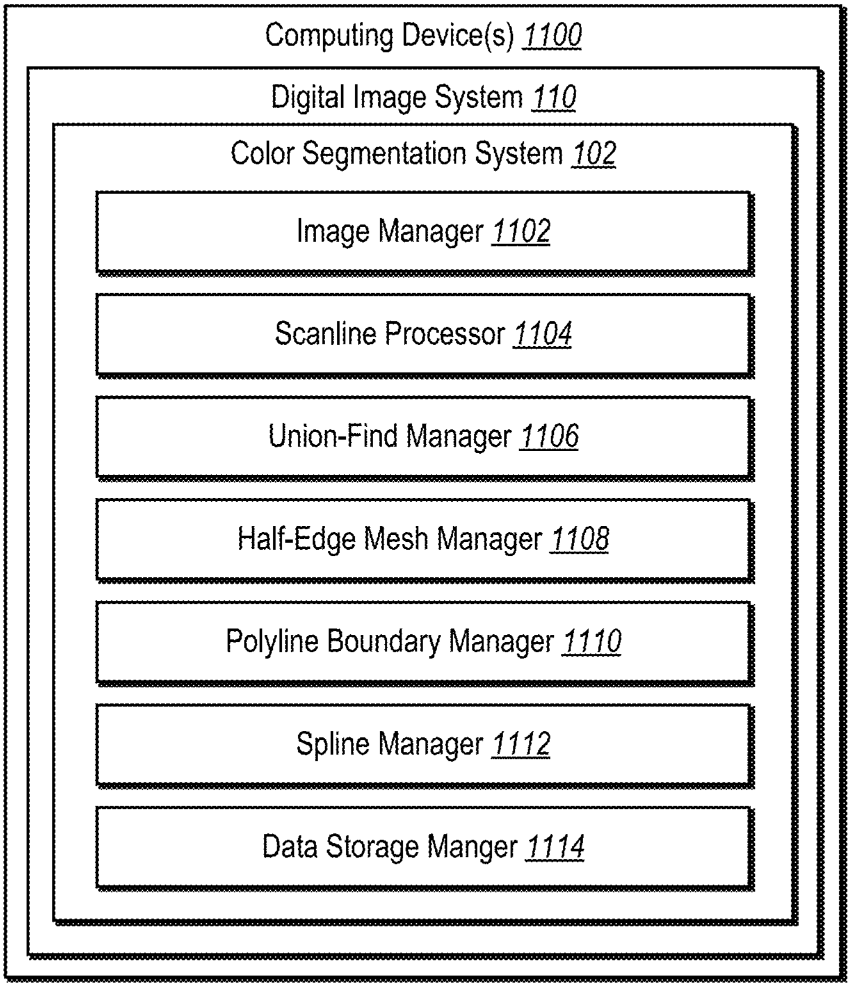
FIG. 11 illustrates a diagram of an example of the color segmentation system in accordance with one or more implementations.

FIG. 11 illustrates a detailed schematic diagram of an embodiment of the color segmentation system 102 described above. As shown, the color segmentation system 102 is implemented in a digital image system 110 on computing device(s) 1100 (e.g., a client device and/or server device as described in FIG. 1, and as further described below in relation to FIG. 13). Additionally, the color segmentation system 102 includes, but is not limited to, an image manager 1102, a scanline processor 1104, a union-find manager 1106, a half-edge mesh manager 1108, a polyline boundary manager 1110, a spline manager 1112, and a data storage manager 1114. In one or more embodiments, the color segmentation system 102 is implemented on any number of computing devices. For example, the color segmentation system 102, in one or more embodiments, is implemented in a distributed system of server devices for digital image editing. Alternatively, the color segmentation system 102 is also implemented within one or more additional systems. For example, the color segmentation system 102, in one or more embodiments, is implemented on a single computing device such as a single client device.

In one or more embodiments, each of the components of the color segmentation system 102 is in communication with other components using any suitable communication technologies. Additionally, the components of the color segmentation system 102 are capable of being in communication with one or more other devices including other computing devices of a user, server devices (e.g., cloud storage devices), licensing servers, or other devices/systems. It will be recognized that although the components of the color segmentation system 102 are shown to be separate in FIG. 11, any of the subcomponents may be combined into fewer components, such as into a single component, or divided into more components as may serve a particular implementation. Furthermore, although the components of FIG. 11 are described in connection with the color segmentation system 102, at least some of the components for performing operations in conjunction with the color segmentation system 102 described herein are implemented on other devices within the environment in other embodiments.

In some embodiments, the components of the color segmentation system 102 include software, hardware, or both. For example, the components of the color segmentation system 102 include one or more instructions stored on a computer-readable storage medium and executable by processors of one or more computing devices (e.g., the computing device(s) 1100). When executed by the one or more processors, the computer-executable instructions of the color segmentation system 102 cause the computing device(s) 1100 to perform the operations described herein. Alternatively, the components of the color segmentation system 102 include hardware, such as a special purpose processing device to perform a certain function or group of functions. Additionally, or alternatively, the components of the color segmentation system 102 include a combination of computer-executable instructions and hardware.

Furthermore, the components of the color segmentation system 102 performing the functions described herein with respect to the color segmentation system 102 may, for example, be implemented as part of a stand-alone application, as a module of an application, as a plug-in for applications, as a library function or functions that may be called by other applications, and/or as a cloud-computing model. Thus, the components of the color segmentation system 102 may be implemented as part of a stand-alone application on a personal computing device or a mobile device. Alternatively, or additionally, the components of the color segmentation system 102 may be implemented in any application that provides digital image editing, including, but not limited to ADOBE® ILLUSTRATOR® and ADOBE® CREATIVE CLOUD® software.

As illustrated, the color segmentation system 102 includes an image manager 1102 to manage digital images for image editing operations. In particular, the image manager 1102 accesses digital images for editing based on user inputs providing the digital images or accessing the digital images from a database of images. Additionally, the image manager 1102 manages the display of image content within a digital image application in connection with various image editing tools including image segmentation or vectorization tools.

The color segmentation system 102 includes a scanline processor 1104 to perform scanline operations on digital images. For example, the scanline processor 1104 performs scanline operations to process scanlines (e.g., rows) of a raster image on a row-by-row basis. Additionally, in some embodiments, the scanline processor 1104 accesses data (e.g., color values) from pixels of the raster image during the scanline operations. In one or more embodiments, the scanline processor 1104 performs scanline operations in connection with a multithreaded processor.

Additionally, the color segmentation system 102 includes a union-find manager 1106 to perform union-find operations on digital images. For example, the union-find manager 1106 generates union-find structures for a digital image during scanline operations by determining sets of adjacent pixels (e.g., zones) with common color values. Additionally, the union-find manager 1106 utilizes updates and searches union-find structures during scanline operations or during boundary tracing operations.

In one or more embodiments, the color segmentation system 102 includes a half-edge mesh manager 1108 to determine half-edge information for digital images. For example, the half-edge mesh manager 1108 generates half-edge mesh structures to store half-edges along boundaries of sets of pixels with common color values. Additionally, the half-edge mesh manager 1108 determines next half-edge directions in the half-edge mesh structures, in addition to other information associated with seed half-edges and/or junctions.

The color segmentation system 102 includes a polyline boundary manager 1110 manages polyline boundary loops for zones of digital images. For example, the polyline boundary manager 1110 communicates with the union-find manager 1106 and the half-edge mesh manager 1108 to generate oriented polyline boundary loops. To illustrate, the polyline boundary manager 1110 generates oriented polyline boundary loops along boundaries of zones based on half-edges and next half-edge directions.

The color segmentation system 102 includes a spline manager 1112 to generate splines that fit to boundaries of zones of digital images. Specifically, the spline manager 1112 fits a spline to a boundary of a zone of a digital image based on a polyline boundary loop corresponding to the boundary of the zone. Additionally, the spline manager 1112 fits splines according to various requirements/thresholds for continuity and gap-free fitting.

The color segmentation system 102 also includes a data storage manager 1114 (that comprises a non-transitory computer memory) that stores and maintains data associated with segmenting digital images and/or vectorizing digital images. For example, the data storage manager 1114 stores data associated with pixels of digital images, including color values of the pixels. The data storage manager 1114 also stores data associated with segmenting portions of digital images including half-edge information, polyline boundary loops, and splines.

Figure 12:
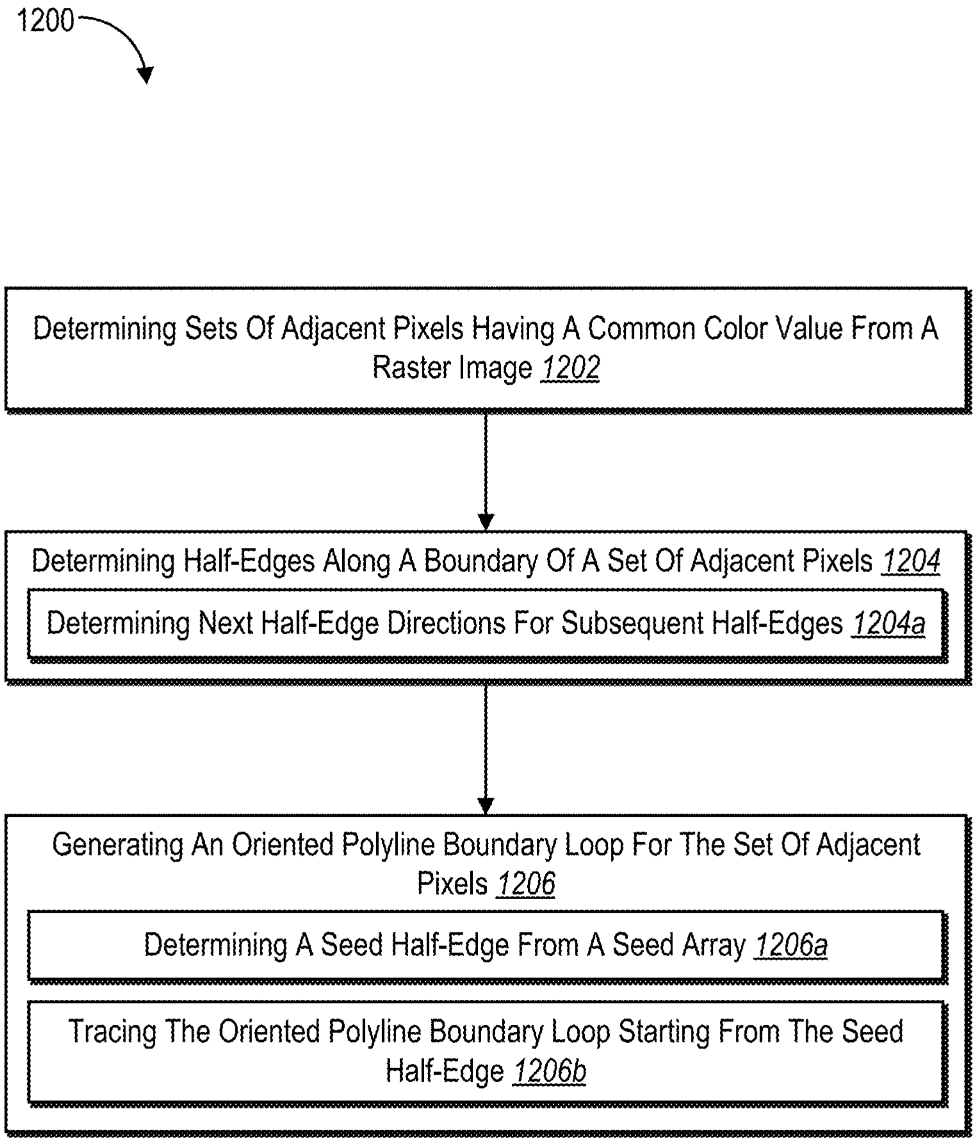
FIG. 12 illustrates a flowchart of a series of acts for generating segmentations of a raster image utilizing a half-edge mesh structure in accordance with one or more implementations.

Turning now to FIG. 12, this figure shows a flowchart of a series of acts 1200 of generating segmentations of a raster image utilizing a half-edge mesh structure. While FIG. 12 illustrates acts according to one embodiment, alternative embodiments may omit, add to, reorder, and/or modify any of the acts shown in FIG. 12. The acts of FIG. 12 are part of a method. Alternatively, a non-transitory computer readable medium comprises instructions, that when executed by one or more processors, cause the one or more processors to perform the acts of FIG. 12. In still further embodiments, a system includes a processor or server configured to perform the acts of FIG. 12.

As shown, the series of acts 1200 includes an act 1202 of determining sets of adjacent pixels having a common color value from a raster image. The series of acts 1200 also includes an act 1204 of determining half-edges along a boundary of a set of adjacent pixels. For example, act 1204 includes act **1204*a* of determining next half-edge directions for subsequent half-edges. The series of acts 1200 also includes an act 1206 of generating an oriented polyline boundary loop for the set of adjacent pixels. Act 1206 further includes an act 1206*a* of determining a seed half-edge from a seed array and an act 1206*b*** of tracing the oriented polyline boundary loop starting from the seed half-edge.

In one or more embodiments, act 1202 involves determining, during scanline operations on a raster image, a plurality of sets of adjacent pixels having a common color value in the raster image. Act 1204 and act **1204*a* involve determining, during the scanline operations on the raster image, a plurality of half-edges at edges of pixels along a boundary of a set of adjacent pixels of the plurality of sets of adjacent pixels with next half-edge directions indicating directions of subsequent half-edges along the boundary of the set of adjacent pixels. Act 1206 involves one or more oriented polyline boundary loops representing the boundary of the set of adjacent pixels from the plurality of half-edges and the next half-edge directions of the set of adjacent pixels. For example, act 1206*a* involves determining, from a seed array of the raster image, a seed half-edge of the plurality of half-edges. Additionally, act 1206*b*** involves tracing the oriented polyline boundary loop starting from the seed half-edge and following the plurality of half-edges according to the next half-edge directions.

In one or more embodiments, act 1204 involves determining, utilizing scanline operations on a raster image, a plurality of half-edges at edges of pixels along a boundary of a set of adjacent pixels with next half-edge directions indicating directions of subsequent half-edges along the boundary of the set of adjacent pixels, the set of adjacent pixels having a common color value. Additionally, in one or more embodiments, the series of acts 1200 includes an act of inserting a seed half-edge from the plurality of half-edges into a seed array for the raster image. In one or more embodiments, act 1206 involves generating an oriented polyline boundary loop corresponding to the boundary of the set of adjacent pixels by tracing the oriented polyline boundary loop starting from the seed half-edge in the seed array and following the plurality of half-edges according to the next half-edge directions.

In one or more embodiments, the series of acts 1200 includes determining whether edges of a pixel in the set of adjacent pixels are at the boundary of the set of adjacent pixels. Furthermore, the series of acts 1200 includes, in response to determining that an edge of the pixel is at the boundary of the set of adjacent pixels: generating a half-edge in a predetermined direction according to a boundary type of the boundary of the set of adjacent pixels for a local neighborhood of adjacent, previously scanned pixels in connection with the scanline operations; and determining a next half-edge direction for the half-edge based on a location of an adjacent half-edge along the boundary in the predetermined direction.

In one or more embodiments, the series of acts 1200 includes setting a first set of bits indicating whether the edges of the pixel have corresponding half-edges or corresponding next half-edge directions; and setting a second set of bits indicating a seed value of the pixel. Furthermore, in some embodiments, the series of acts 1200 includes setting a third set of bits comprising a junction flag indicating whether a corner of the pixel corresponds to a junction of three or more sets of adjacent pixels. In some embodiments, the series of acts 1200 includes setting a third set of bits indicating whether the pixel has a color value equal to a previous pixel in a scanline.

In one or more embodiments, the series of acts 1200 includes generating a hash table assigning consecutive zone indices to a plurality of sets of adjacent pixels of the raster image by traversing over seed half-edges from a seed array of the raster image, the seed array including at least one seed half-edge for each of the plurality of sets of adjacent pixels. In one or more embodiments, the series of acts 1200 includes determine a corresponding set of adjacent pixels for a pixel of the raster image by accessing a set of bits of an integer array of the pixel indicating whether the pixel has a color value equal to a previous pixel in a scanline. For example, the series of acts 1200 includes in response to determining that the pixel has the color value equal to the previous pixel in the scanline, assign a zone index of the previous pixel to the pixel.

According to one or more embodiments, the series of acts 1200 includes determining a seed half-edge of the set of adjacent pixels from a seed array of the raster image. Additionally, the series of acts 1200 includes tracing an oriented polyline boundary loop beginning at the seed half-edge and proceeding with one or more additional half-edges along the boundary of the set of adjacent pixels according to the next half-edge directions of the plurality of half-edges. The series of acts 1200 also includes inserting a first vertex at a first midpoint of a current half-edge, determining that the current half-edge does not terminate at a junction of three or more sets of adjacent pixels; and inserting a second vertex at a second midpoint of a subsequent half-edge that connects to the first vertex.

In some embodiments, the series of acts 1200 includes accessing a hash table including sequences of fitted splines indexed by corresponding polyline boundary segments. The series of acts 1200 further includes determining that the polyline boundary segment has a fitted spline in a reversed direction. The series of acts 1200 includes assigning control points of the fitted spline in the reversed direction to the spline of the polyline boundary segment according to a direction of the polyline boundary segment.

In one or more embodiments, the series of acts 1200 includes generating, during the scanline operations on the raster image, an integer array for a pixel of the raster image comprising a set of bits indicating half-edge information for edges of the pixel and next half-edge direction information. The series of acts 1200 also includes merging the pixel into the set of adjacent pixels based on a color value of the pixel and a color value associated with the set of adjacent pixels. The series of acts 1200 further includes, in response to merging the pixel into the set of adjacent pixels, updating the integer array of the pixel and one or more integer arrays of one or more pixels in a neighborhood of the pixel according to an updated boundary of the set of adjacent pixels.

In some embodiments, the series of acts 1200 also includes selecting a particular half-edge of the set of adjacent pixels as the seed half-edge based on a position of the particular half-edge within the boundary of the set of adjacent pixels. The series of acts 1200 further includes setting a bit in the integer array to indicate that the particular half-edge is the seed half-edge, and appending a reference to the particular half-edge in the seed array of the raster image.

In some embodiments, the series of acts 1200 includes determining, during the scanline operations on the raster image, that one or more additional pixels diagonally connected to the set of adjacent pixels have the common color value. Additionally, the series of acts 1200 includes merging the set of adjacent pixels with the one or more additional pixels in response to determining that the set of adjacent pixels or the one or more additional pixels belong to a thin structure of pixels.

In one or more embodiments, the series of acts 1200 includes determining that a current half-edge terminates at a junction based on an integer array of the current half-edge or an additional integer array of a subsequent half-edge. The series of acts 1200 also includes generating a vertex at an endpoint of the current half-edge, and generating a first polyline boundary segment from a first midpoint of the current half-edge to the vertex at the endpoint of the current half-edge and a second polyline boundary segment from the endpoint of the current half-edge to a second midpoint of the subsequent half-edge.

In one or more embodiments, the series of acts 1200 includes dividing the raster image into a plurality of blocks of pixel rows in connection with utilizing a multithreading processor including a plurality of threads. The series of acts 1200 further includes determining, for a first block of the plurality of blocks, the plurality of half-edges at the edges of the pixels along the boundary of the set of adjacent pixels. The series of acts 1200 also includes determining, for a second block of the plurality of blocks, an additional plurality of half-edges at edges of pixels along a boundary of an additional set of adjacent pixels, the additional set of adjacent pixels being adjacent to the set of adjacent pixels. The series of acts 1200 also includes combining the set of adjacent pixels and the additional set of adjacent pixels in response to determining that the set of adjacent pixels and the additional set of adjacent pixels have the common color value. Additionally, the series of acts 1200 includes updating half-edge information and next half-edge direction information for the pixels of the set of adjacent pixels and the pixels the additional set of adjacent pixels based on a merged boundary.

In one or more embodiments, the series of acts 1200 includes generating integer arrays for pixels in the set of adjacent pixels including: a first set of bits indicating the plurality of half-edges and the next half-edge directions; and a second set of bits indicating whether the plurality of half-edges are seed half-edges. Furthermore, in one or more embodiments, the series of acts 1200 includes determining the seed half-edge based on the second set of bits of the integer arrays. The series of acts 1200 also includes tracing a plurality of polyline boundary segments along the boundary of the set of adjacent pixels starting from the seed half-edge and inserting vertices based on the plurality of half-edges and the next half-edge directions of the first set of bits of the integer arrays.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
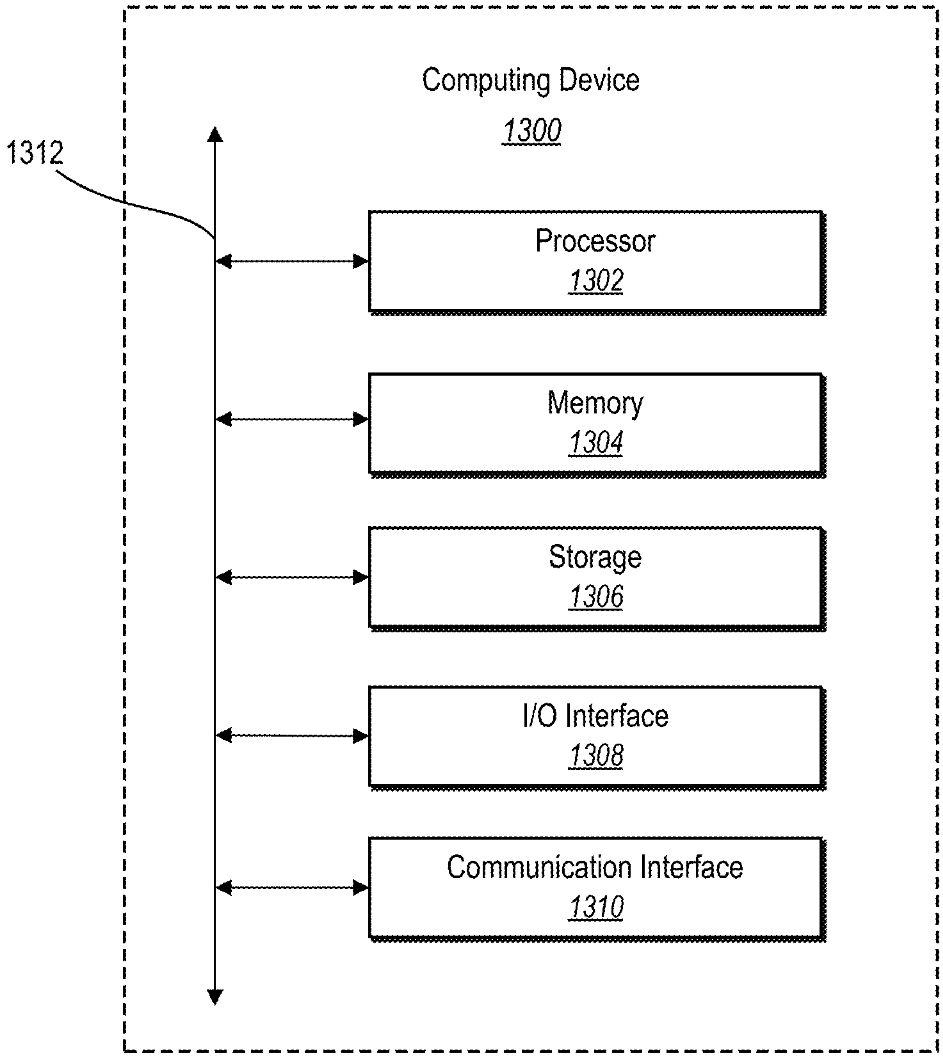
FIG. 13 illustrates a block diagram of an exemplary computing device in accordance with one or more implementations.

FIG. 13 illustrates a block diagram of exemplary computing device 1300 that may be configured to perform one or more of the processes described above. One will appreciate that one or more computing devices such as the computing device 1300 may implement the system(s) of FIG. 1. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. In certain embodiments, the computing device 1300 can include fewer or more components than those shown in FIG. 13. Components of the computing device 1300 shown in FIG. 13 will now be described in additional detail.

In one or more embodiments, the processor 1302 includes hardware for executing instructions, such as those making up a computer program. As an example, and not by way of limitation, to execute instructions for dynamically modifying workflows, the processor 1302 may retrieve (or fetch) the instructions from an internal register, an internal cache, the memory 1304, or the storage device 1306 and decode and execute them. The memory 1304 may be a volatile or non-volatile memory used for storing data, metadata, and programs for execution by the processor(s). The storage device 1306 includes storage, such as a hard disk, flash disk drive, or other digital storage device, for storing data or instructions for performing the methods described herein.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example, and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1310 may facilitate communications with various types of wired or wireless networks. The communication interface 1310 may also facilitate communications using various communication protocols. The communication infrastructure 1312 may also include hardware, software, or both that couples components of the computing device 1300 to each other. For example, the communication interface 1310 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
- determining, by at least one processor during scanline operations on a raster image, a plurality of sets of adjacent pixels having a common color value in the raster image;
- determining, by the at least one processor during the scanline operations on the raster image, a half-edge mesh structure comprising a plurality of half-edges at edges of pixels along a boundary of a set of adjacent pixels of the plurality of sets of adjacent pixels, the half-edge mesh structure including a half-edge as a directed vector representing an edge of a pixel in a single direction and a next half-edge direction indicating a direction of a subsequent half-edge along the boundary of the set of adjacent pixels; and
- generating, by the at least one processor, one or more oriented polyline boundary loops representing the boundary of the set of adjacent pixels from the plurality of half-edges and the next half-edge directions of the set of adjacent pixels.

2. The computer-implemented method of claim 1, wherein determining the plurality of half-edges comprises:
- determining whether the edges of the pixel in the set of adjacent pixels are at the boundary of the set of adjacent pixels; and
- in response to determining that the edge of the pixel is at the boundary of the set of adjacent pixels:
  - generating the half-edge in a predetermined direction according to a boundary type of the boundary of the set of adjacent pixels for a local neighborhood of adjacent, previously scanned pixels in connection with the scanline operations; and
  - determining the next half-edge direction for the half-edge based on a location of an adjacent half-edge along the boundary in the predetermined direction.

3. The computer-implemented method of claim 2, further comprising generating an integer array for the pixel in the set of adjacent pixels comprising:

setting a first set of bits indicating whether the edges of the pixel have corresponding half-edges or corresponding next half-edge directions; and setting a second set of bits indicating a seed value of the pixel.

4. The computer-implemented method of claim 3, wherein generating the integer array for the pixel of the set of adjacent pixels comprises setting a third set of bits comprising a junction flag indicating whether a corner of the pixel corresponds to a junction of three or more sets of adjacent pixels.

5. The computer-implemented method of claim 3, wherein generating the integer array for the pixel of the set of adjacent pixels comprises setting a third set of bits indicating whether the pixel has a color value equal to a previous pixel in a scanline.

6. The computer-implemented method of claim 1, further comprising generating a hash table assigning consecutive zone indices to the plurality of sets of adjacent pixels of the raster image by traversing over seed half-edges from a seed array of the raster image, the seed array including at least one seed half-edge for each of the plurality of sets of adjacent pixels.

7. The computer-implemented method of claim 6, wherein generating the one or more oriented polyline boundary loops comprises querying the hash table to:

determine a corresponding set of adjacent pixels for a pixel of the raster image by accessing a set of bits of an integer array of the pixel indicating whether the pixel has a color value equal to a previous pixel in a scanline; and in response to determining that the pixel has the color value equal to the previous pixel in the scanline, assign a zone index of the previous pixel to the pixel.

8. The computer-implemented method of claim 1, wherein generating the one or more oriented polyline boundary loops comprises:

determine a seed half-edge of the set of adjacent pixels from a seed array of the raster image; and trace an oriented polyline boundary loop beginning at the seed half-edge and proceeding with one or more additional half-edges along the boundary of the set of adjacent pixels according to the next half-edge directions of the plurality of half-edges.

9. The computer-implemented method of claim 8, wherein tracing the oriented polyline boundary loop comprises:

inserting a first vertex at a first midpoint of a current half-edge;

determining that the current half-edge does not terminate at a junction of three or more sets of adjacent pixels; and inserting a second vertex at a second midpoint of the subsequent half-edge that connects to the first vertex.

10. The computer-implemented method of claim 8, further comprising fitting a spline to a polyline boundary segment of the oriented polyline boundary loop by:

accessing a hash table including sequences of fitted splines indexed by corresponding polyline boundary segments;

determining that the polyline boundary segment has a fitted spline in a reversed direction; and assigning control points of the fitted spline in the reversed direction to the spline of the polyline boundary segment according to a direction of the polyline boundary segment.

11. A system comprising:

one or more memory devices; and one or more processors configured to cause the system to:

determine, utilizing scanline operations on a raster image, a half-edge mesh structure comprising a plurality of half-edges at edges of pixels along a boundary of a set of adjacent pixels, the half-edge mesh structure including a half-edge as a directed vector representing an edge of a pixel in a single direction and a next half-edge direction indicating a direction of a subsequent half-edge along the boundary of the set of adjacent pixels, the set of adjacent pixels having a common color value;

insert a seed half-edge from the plurality of half-edges into a seed array for the raster image;

generate an oriented polyline boundary loop corresponding to the boundary of the set of adjacent pixels by tracing the oriented polyline boundary loop starting from the seed half-edge in the seed array and following the plurality of half-edges according to the next half-edge directions of the set of adjacent pixels; and generating a spline corresponding to the boundary of the set of adjacent pixels by fitting the spline to the oriented polyline boundary loop.

12. The system of claim 11, wherein the one or more processors are configured to cause the system to determine the plurality of half-edges by:

generating, during the scanline operations on the raster image, an integer array for a pixel of the raster image comprising a set of bits indicating half-edge information for the edges of the pixel and next half-edge direction information;

merging the pixel into the set of adjacent pixels based on a color value of the pixel and a color value associated with the set of adjacent pixels; and in response to merging the pixel into the set of adjacent pixels, updating the integer array of the pixel and one or more integer arrays of one or more pixels in a neighborhood of the pixel according to an updated boundary of the set of adjacent pixels.

13. The system of claim 12, wherein the one or more processors are configured to cause the system to insert the seed half-edge into the seed array by:

selecting a particular half-edge of the set of adjacent pixels as the seed half-edge based on a position of the particular half-edge within the boundary of the set of adjacent pixels;

setting a bit in the integer array to indicate that the particular half-edge is the seed half-edge; and appending a reference to the particular half-edge in the seed array of the raster image.

14. The system of claim 11, wherein the one or more processors are configured to cause the system to generate the oriented polyline boundary loop by:

determining the seed half-edge from the seed array;

determining, from an integer array of the seed half-edge, the next half-edge direction corresponding to the subsequent half-edge in the plurality of half-edges; and generating vertices connecting a first point in the seed half-edge to a second point in the subsequent half-edge.

15. The system of claim 11, wherein the one or more processors are further configured to cause the system to determine the set of adjacent pixels by:

determining, during the scanline operations on the raster image, that one or more additional pixels diagonally connected to the set of adjacent pixels have the common color value; and merging the set of adjacent pixels with the one or more additional pixels in response to determining that the set of adjacent pixels or the one or more additional pixels belong to a thin structure of pixels.

16. The system of claim 11, wherein the one or more processors are configured to cause the system to generate the oriented polyline boundary loop by:

determining that a current half-edge terminates at a junction based on an integer array of the current half-edge or an additional integer array of the subsequent half-edge;

generating a vertex at an endpoint of the current half-edge; and generating a first polyline boundary segment from a first midpoint of the current half-edge to the vertex at the endpoint of the current half-edge and a second polyline boundary segment from the endpoint of the current half-edge to a second midpoint of the subsequent half-edge.

17. The system of claim 11, wherein the one or more processors are configured to cause the system to:

divide the raster image into a plurality of blocks of pixel rows in connection with utilizing a multithreading processor including a plurality of threads;

determine, for a first block of the plurality of blocks, the plurality of half-edges at the edges of the pixels along the boundary of the set of adjacent pixels;

determine, for a second block of the plurality of blocks, an additional plurality of half-edges at the edges of pixels along a boundary of an additional set of adjacent pixels, the additional set of adjacent pixels being adjacent to the set of adjacent pixels;

combine the set of adjacent pixels and the additional set of adjacent pixels in response to determining that the set of adjacent pixels and the additional set of adjacent pixels have the common color value; and update half-edge information and next half-edge direction information for the pixels of the set of adjacent pixels and the pixels the additional set of adjacent pixels based on a merged boundary.

18. A non-transitory computer readable medium storing executable instructions which, when executed by a processing device, cause the processing device to perform operations comprising:

determining, during scanline operations on a raster image, a plurality of sets of adjacent pixels having a common color value in the raster image;

determining, during the scanline operations on the raster image, a half-edge mesh structure comprising a plurality of half-edges at edges of pixels along a boundary of a set of adjacent pixels of the plurality of sets of adjacent pixels, the half-edge mesh structure including a half-edge as a directed vector representing an edge of a pixel in a single direction and a next half-edge direction indicating a direction of a subsequent half-edge along the boundary of the set of adjacent pixels; and generating an oriented polyline boundary loop corresponding to the boundary of the set of adjacent pixels by:

determining, from a seed array of the raster image, a seed half-edge of the plurality of half-edges; and tracing the oriented polyline boundary loop starting from the seed half-edge and following the plurality of half-edges according to the next half-edge directions of the set of adjacent pixels.

19. The non-transitory computer readable medium of claim 18, wherein determining the plurality of half-edges comprises generating integer arrays for pixels in the set of adjacent pixels including:

a first set of bits indicating the plurality of half-edges and the next half-edge directions; and a second set of bits indicating whether the plurality of half-edges are seed half-edges.

20. The non-transitory computer readable medium of claim 19, wherein generating the oriented polyline boundary loop comprises:

determining the seed half-edge based on the second set of bits of the integer arrays; and tracing a plurality of polyline boundary segments along the boundary of the set of adjacent pixels starting from the seed half-edge and inserting vertices based on the plurality of half-edges and the next half-edge directions of the first set of bits of the integer arrays.

* * * * *